Aug. 7, 1945.   G. F. WALES   2,381,476
PERFORATING APPARATUS
Filed Sept. 18, 1942   13 Sheets-Sheet 1

INVENTOR
George F. Wales
BY
Parker, Brockwood & Farmer
ATTORNEYS

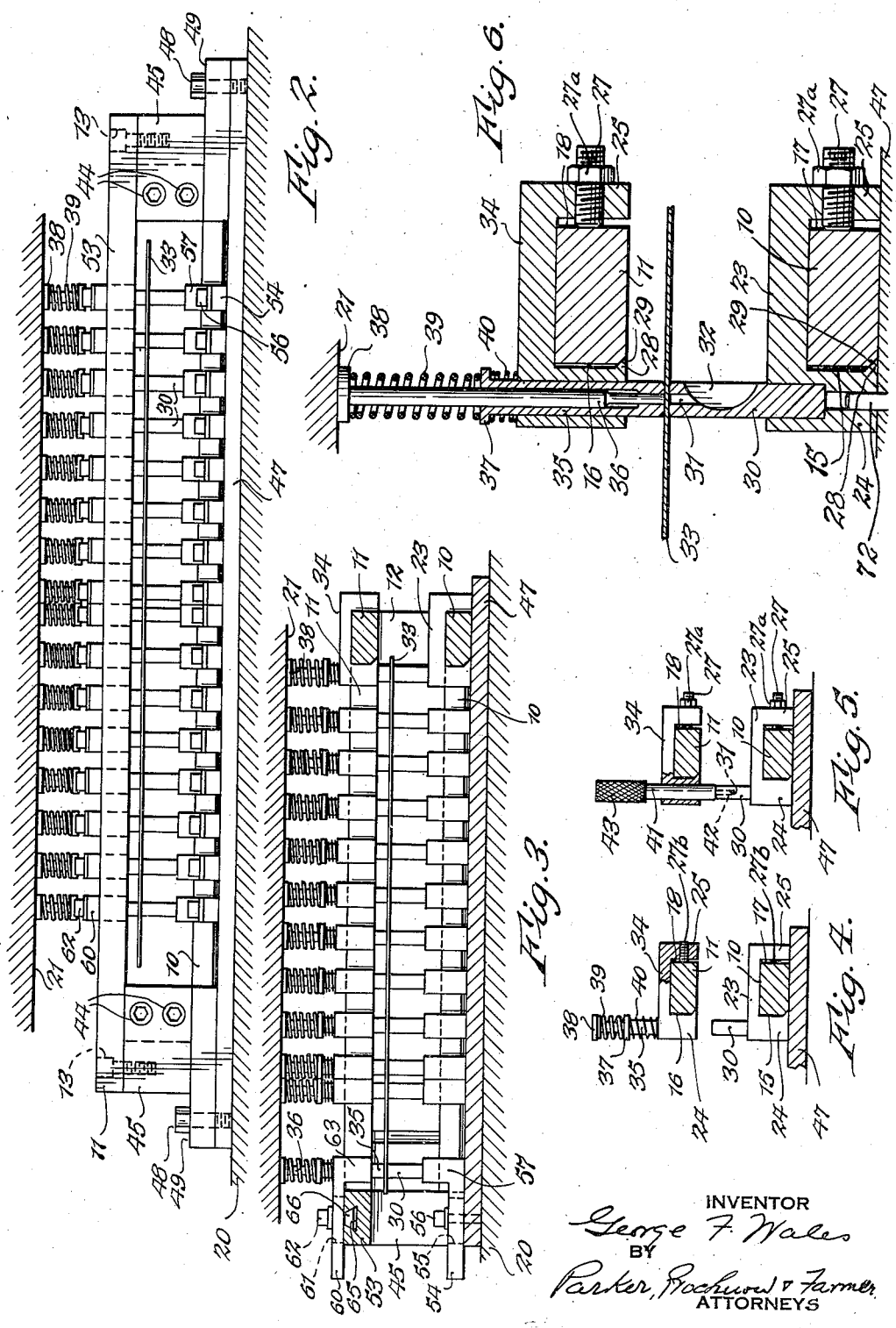

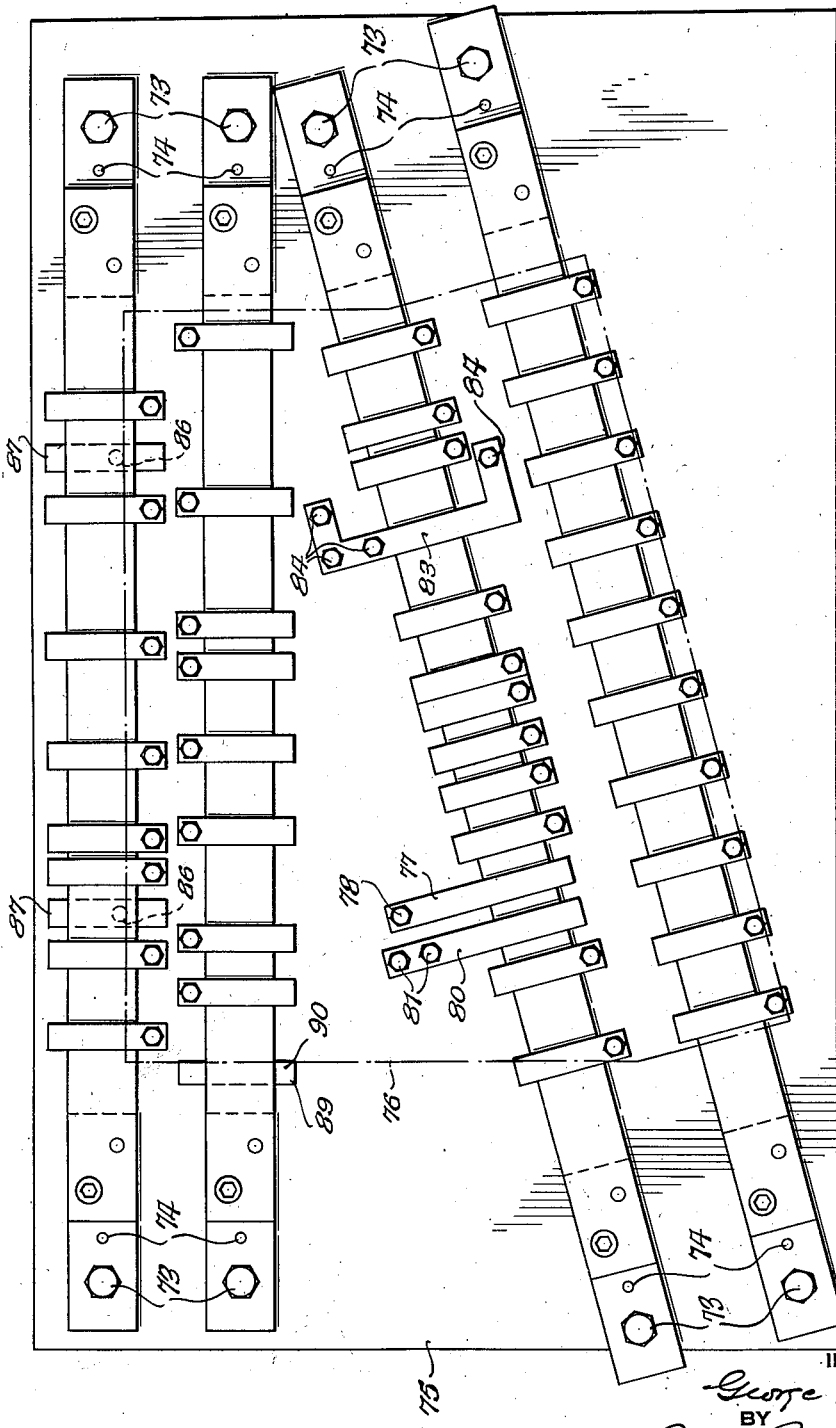

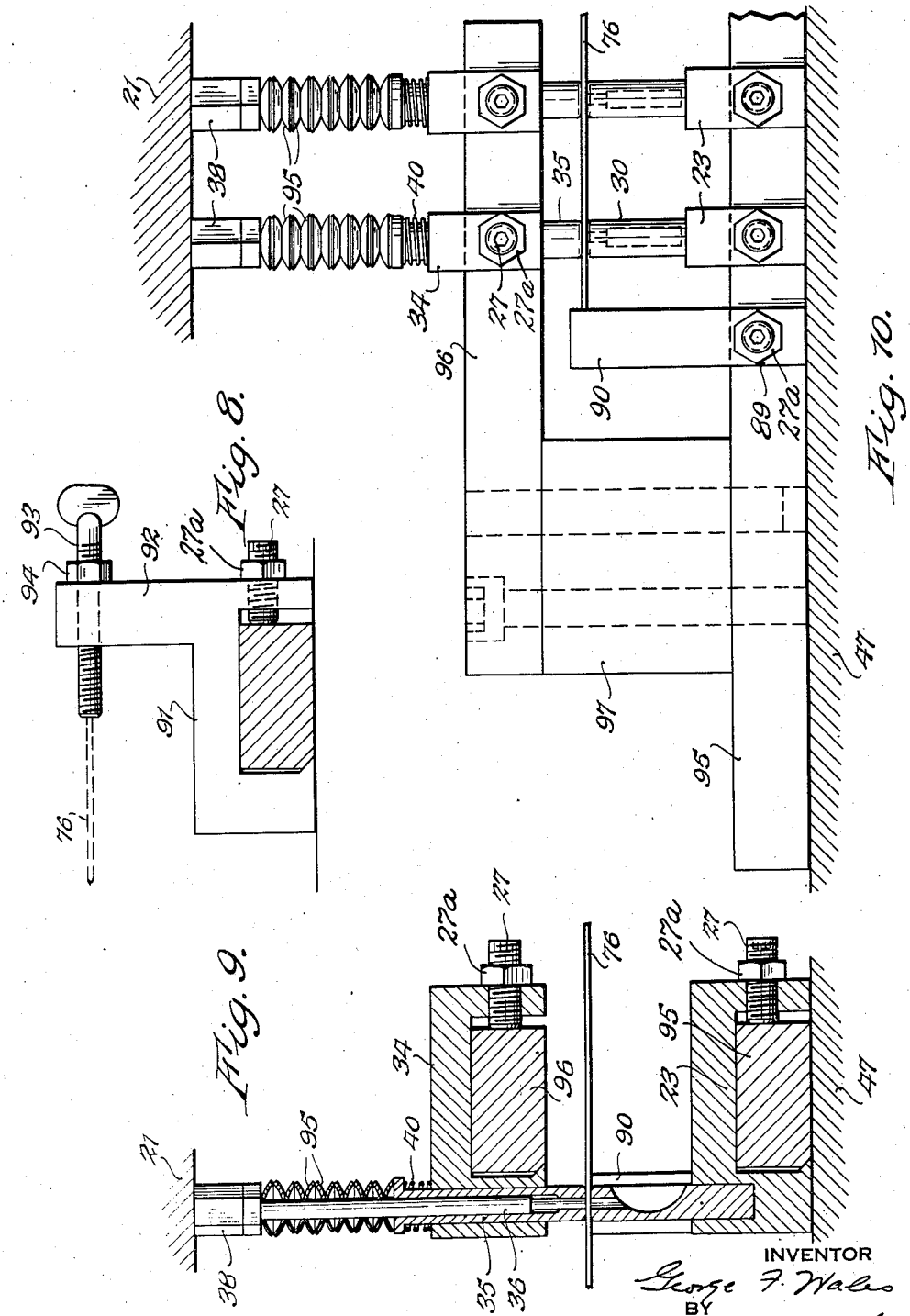

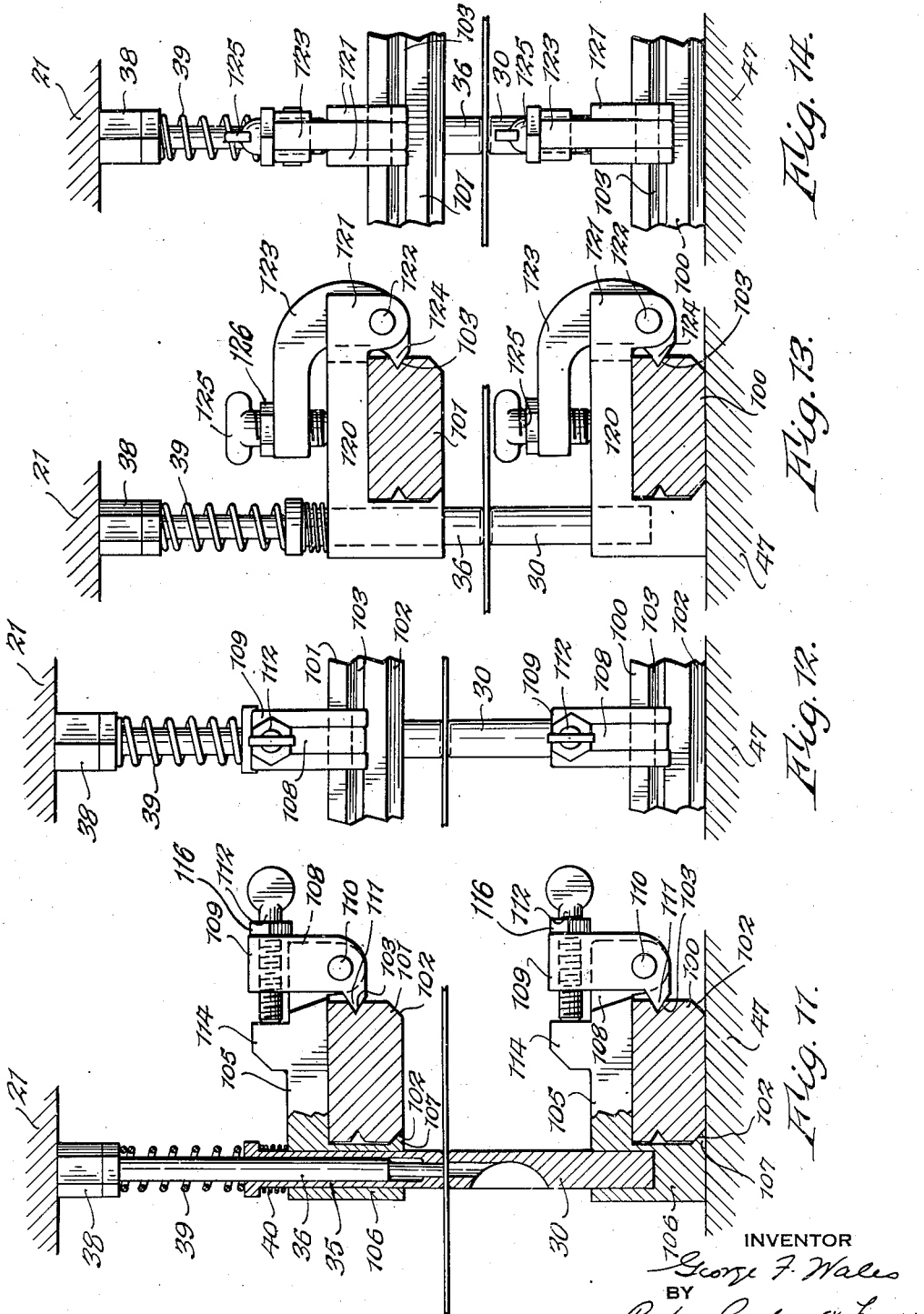

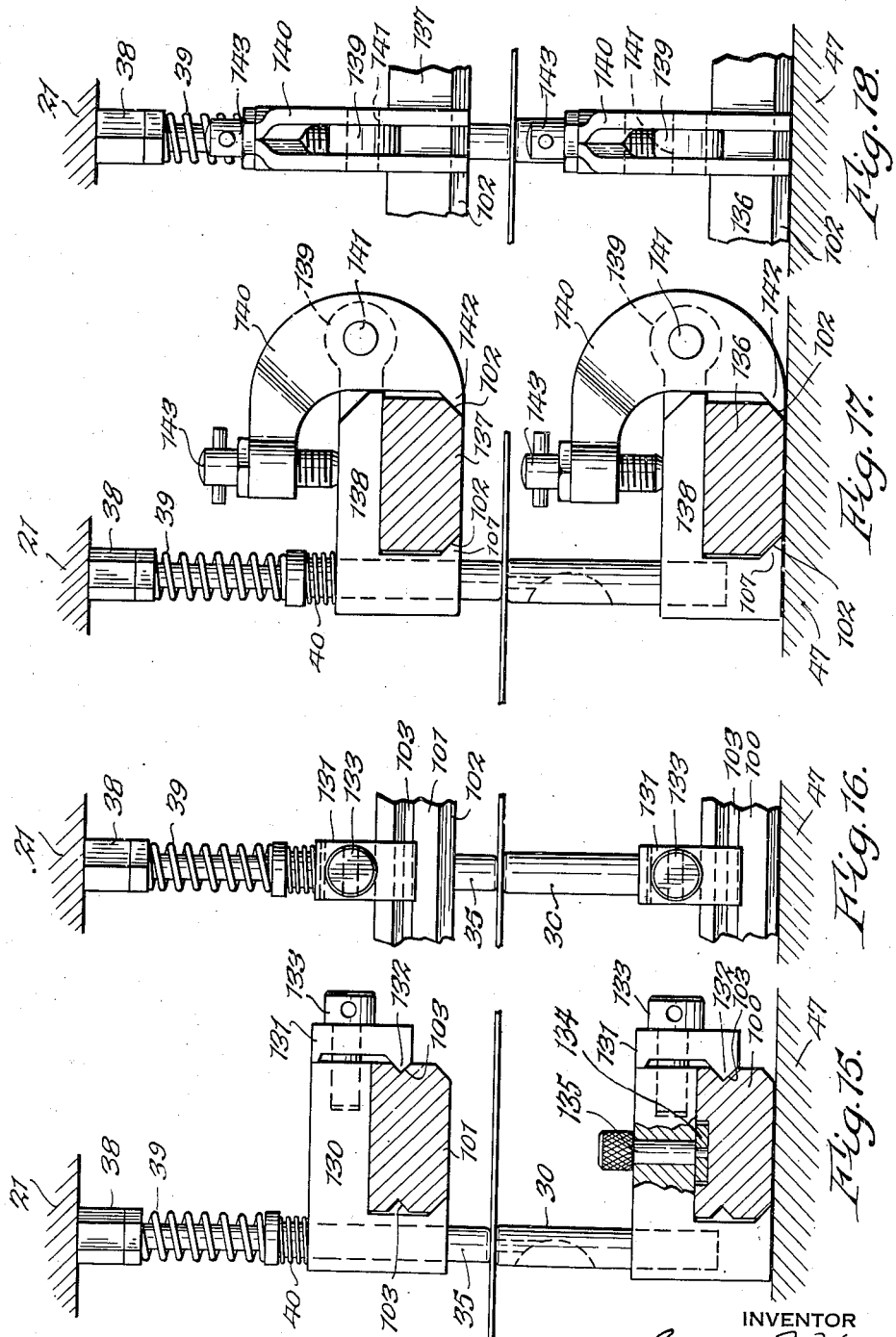

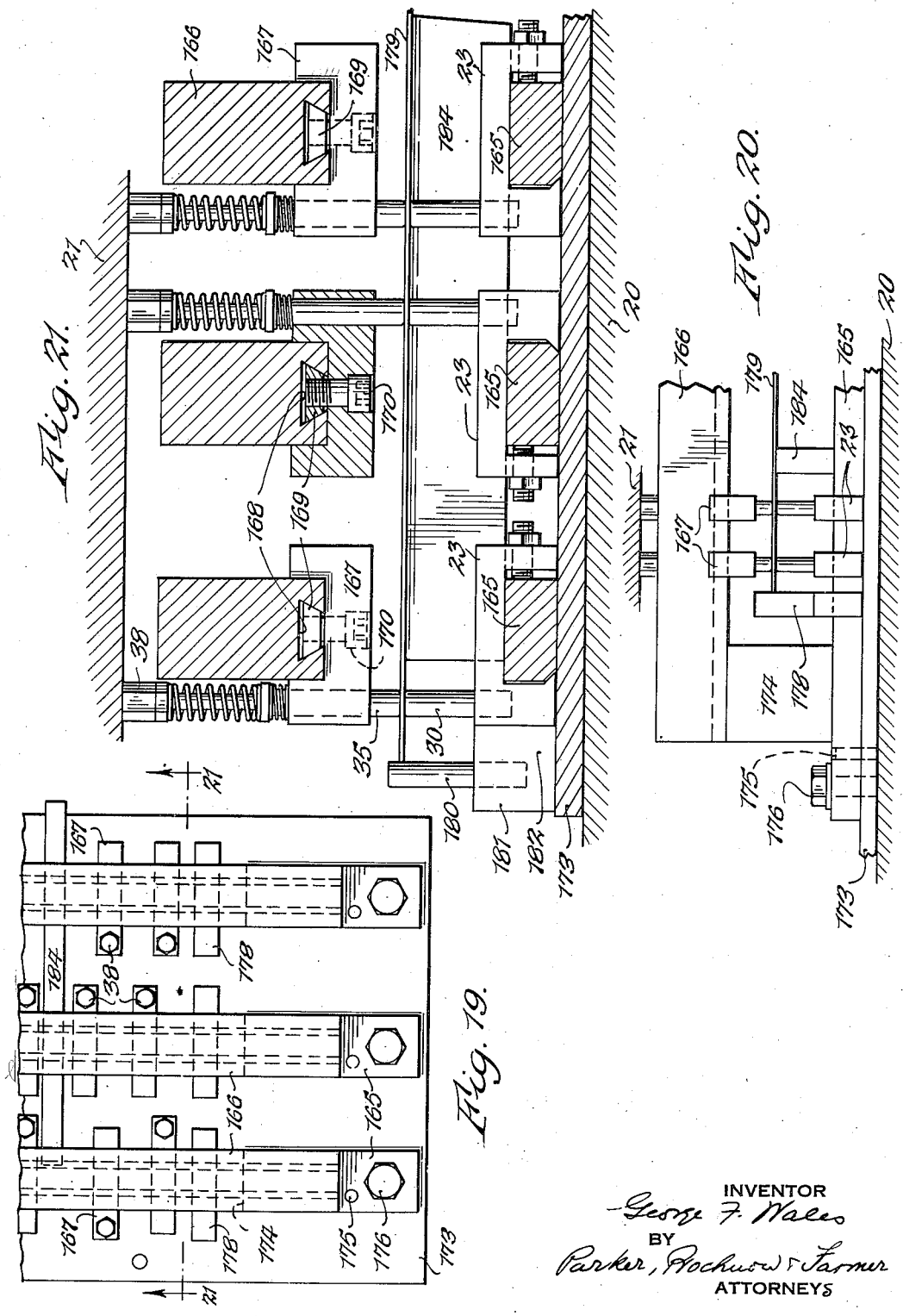

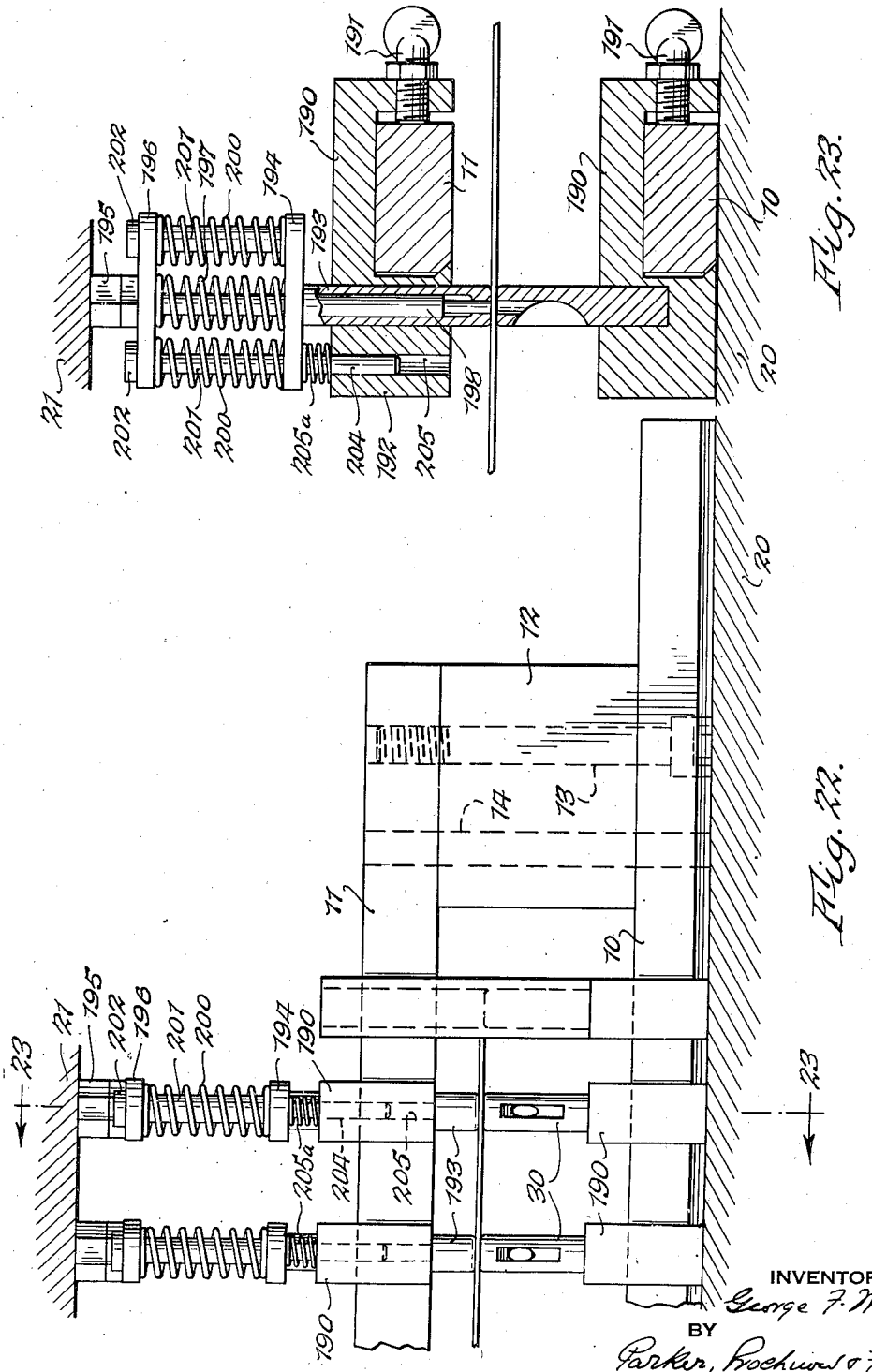

Aug. 7, 1945.   G. F. WALES   2,381,476
PERFORATING APPARATUS
Filed Sept. 18, 1942   13 Sheets-Sheet 9
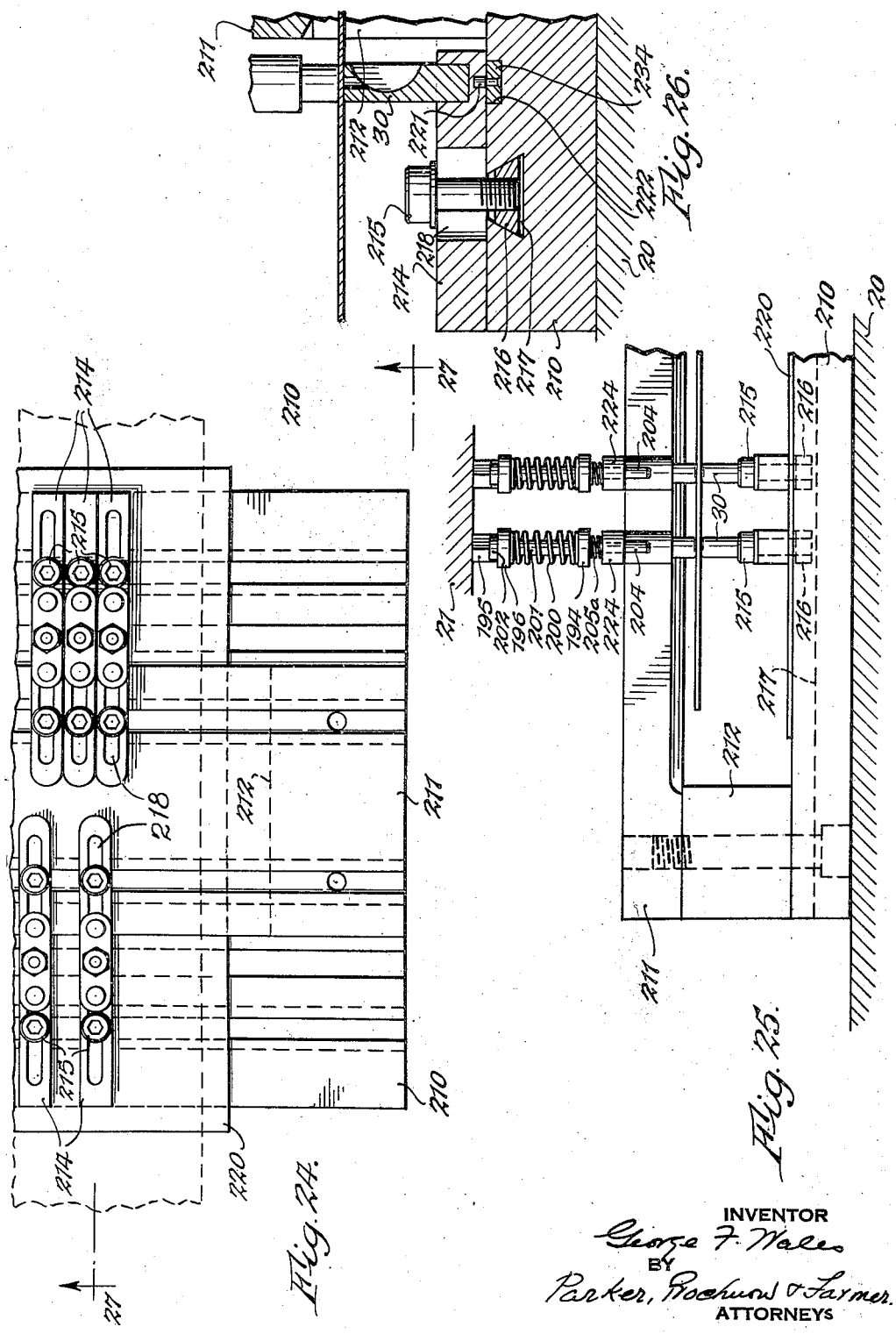
INVENTOR
George F. Wales
BY
Parker, Rockwood & Farmer.
ATTORNEYS

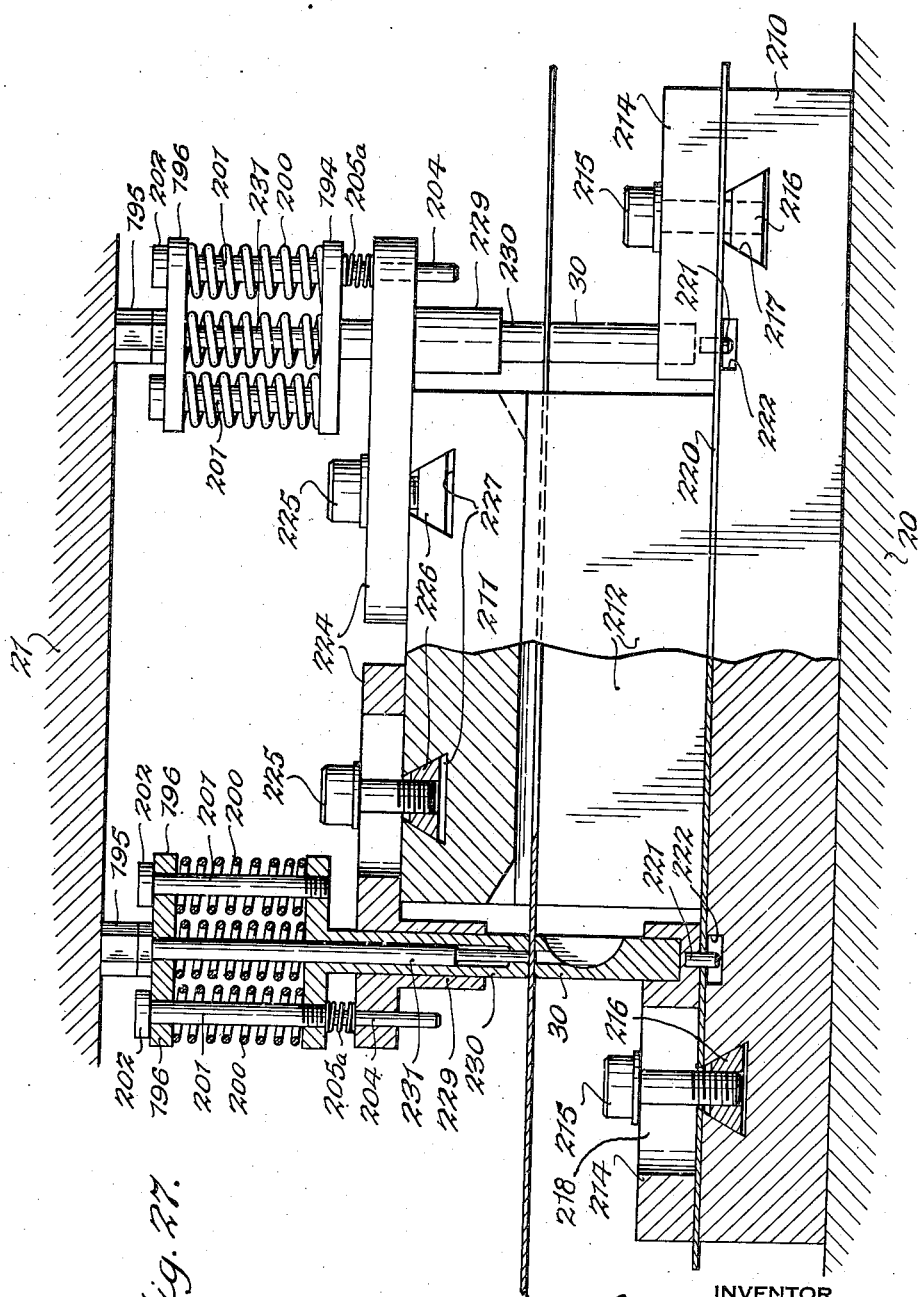

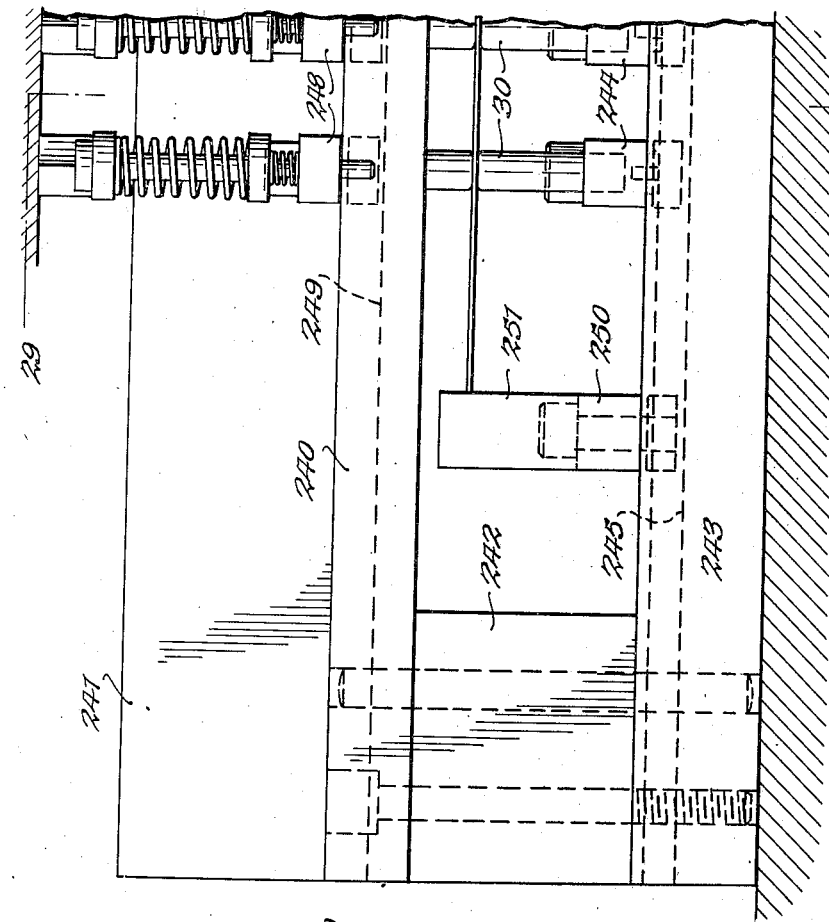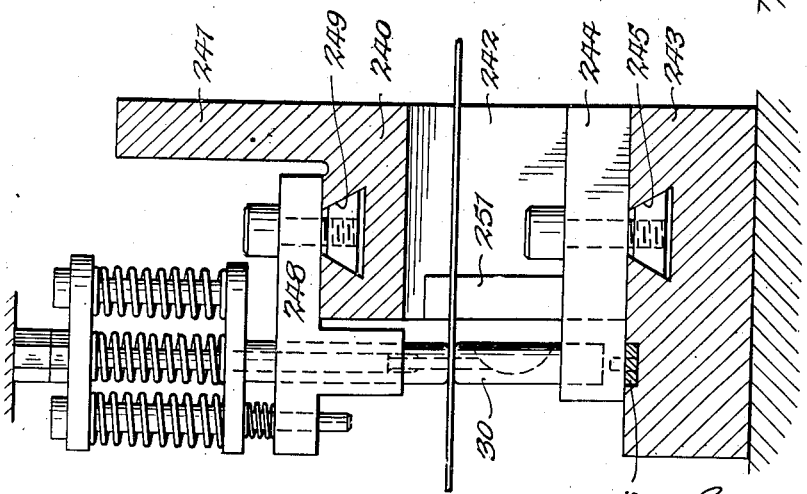

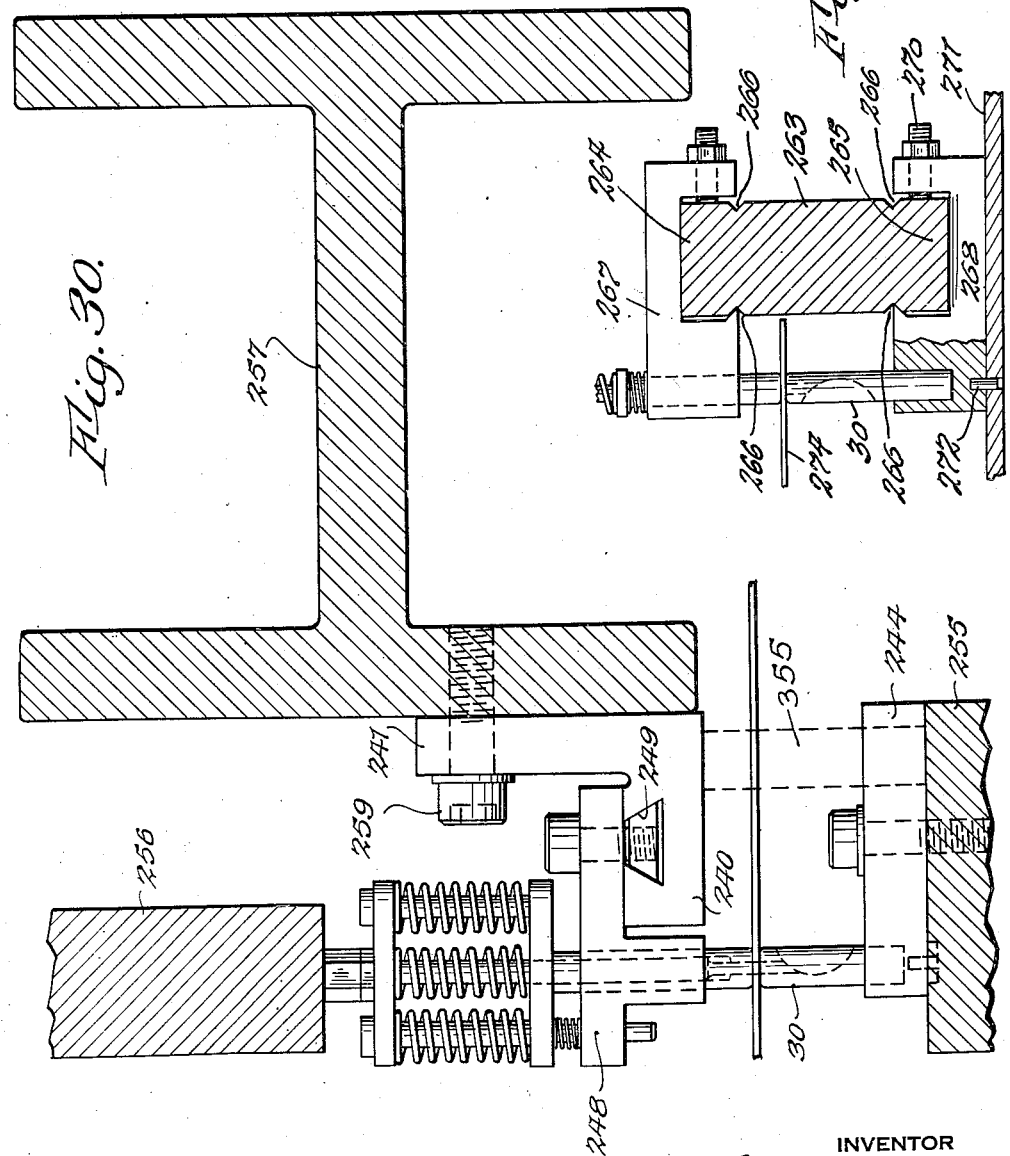

Aug. 7, 1945.   G. F. WALES   2,381,476
PERFORATING APPARATUS
Filed Sept. 18, 1942   13 Sheets-Sheet 13
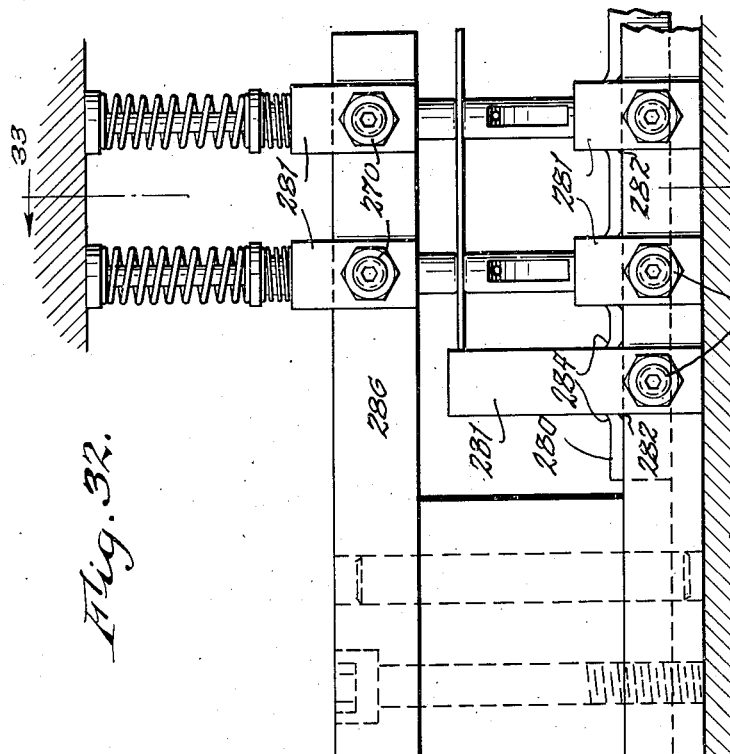
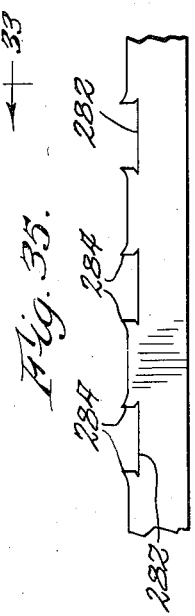
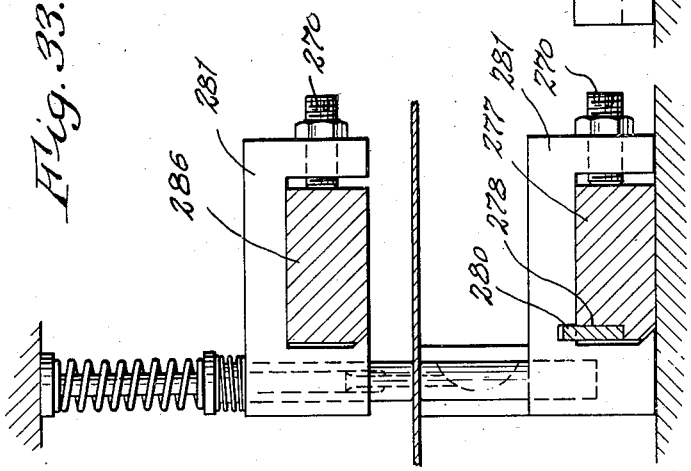
INVENTOR
George F. Wales
BY
Parker, Rockwood & Farmer
ATTORNEYS Patented Aug. 7, 1945

2,381,476

UNITED STATES PATENT OFFICE 2,381,476

PERFORATING APPARATUS

George F. Wales, Kenmore, N. Y.

Application September 18, 1942, Serial No. 458,833

55 Claims. (Cl. 164—90)

This invention relates to apparatus for punching holes at points selected throughout the areas of sheets of material. This invention is particularly adapted for punching the numerous rivet holes required in thin metal panels or sheets which are used in forming the outer surfaces of aircraft wings, fuselages, and the like, but the invention may be applied to other uses where relatively large numbers of holes are required in sheets of material.

Due to the large number of closely spaced and accurately located holes required in the relatively large panels used in airplane construction, it has heretofore been impractical to punch these holes by means of hole punching dies and, consequently, these holes have heretofore been formed by means of drill presses, which "stack drill" the holes one at a time in stacks of sheets. This is a slow, laborious and costly procedure.

One of the objects of this invention is to provide an improved method and apparatus for simultaneously punching large numbers of holes in the desired locations throughout the areas of sheets of material. Another object is to provide an apparatus and method of this kind in which the punches and dies may be accurately placed on a frame while the same is outside of the press on which it is to be used, and which frame may then be placed into the press for use without further delay in the time of operation of the press. A further object is to provide an apparatus of this kind which includes a plurality of frames having perforating devices mounted thereon and which frames are correctly positioned in fixed relation to each other.

It is a further object of this invention to provide a frame comprising upper and lower rails or supporting members rigidly fastened together at their ends and spaced apart to provide a gap of sufficient length to permit the work to be passed into these frames between the rails or members of the frame, these members of the frame supporting a number of punches and dies. A further object is to provide punch units which can be readily adjusted on and rigidly secured to one of the members of the frame and each of which is provided with a stripping element. A further object is to provide a frame of this kind which adjustably supports the perforating devices and on which these devices are removably mounted. Another object is to provide a frame having upper and lower rails arranged in fixed and spaced relation to each other and formed to adjustably support a punching device on one rail in correct operative relation to a die device mounted on the other rail.

A further object of this invention is to provide a punching apparatus of this type in which the work perforating members carried by the upper frame member are so mounted thereon that none of the pressures required for punching and stripping the work are exerted against this frame member. A further object is to provide a device of this kind in which the main work perforating pressure exerted by the ram of the press is transmitted through the punches and dies to the bed of the press without passing through the frame or frames on which the perforating devices are mounted, so that deformation or flexing of the frame members is avoided.

A further object is to provide a perforating apparatus including a frame member having punches and dies arranged at a side thereof and adjustably mounted thereon.

A further object of this invention is to provide an apparatus for punching sheet material, which includes a plurality of frames supporting the perforating devices and each comprising a pair of rigid frame members connected at their ends and having their intermediate portions spaced apart to receive between them the work.

Another object of this invention is to provide frames, which carry punches and dies, with stop gages of improved construction for cooperating with the work to correctly locate the work with reference to the perforating devices.

It is a further object of this invention to provide a punching apparatus of this type in which the perforating devices are adjustably mounted on the frames to produce an assembly of punching mechanisms in which no part is attached to the ram of the press or machine in which the apparatus is operated.

It is also an object of this invention to provide an apparatus of this type with guide means of improved construction for supporting the work when fed to the apparatus and while being perforated.

Another object is to provide apparatus of this type constructed for cooperation with templates for locating the punch and die units in correct relations to each other and to the work. A further object is to provide apparatus of this kind in which the perforating devices may be positioned thereon by use of a correctly perforated sample work piece.

Another object is to provide an improved perforating apparatus and method of perforating sheet material, in which a number of frames each carrying a plurality of perforating devices are positioned on a template having means for accurately locating the frames in correct relation to each other.

It is a further object of this invention to provide the upper rail or member of a frame with reinforcing means for preventing deflection or bending of such member due to its own weight.

Other objects and advantages of this invention will appear from the following description and claims.

In the accompanying drawings:

Fig. 2 is a front elevation thereof.

Fig. 3 is a sectional elevation thereof, on line 3—3, Fig. 1.

Fig. 4 is a sectional elevation thereof, approximately on line 4—4, Fig. 1, but showing the punch in raised position.

Fig. 5 is a sectional elevation of a frame member of the apparatus showing means for axially alining the punch and die of a perforating device.

Fig. 6 is a sectional elevation thereof, on line 4—4, Fig. 1, on an enlarged scale.

Fig. 7 is a top plan view of a punching apparatus of modified construction.

Fig. 8 is a fragmentary transverse sectional elevation of a frame member showing a gage or stop for the work mounted thereon.

Fig. 9 is a sectional elevation similar to Fig. 6, but showing a stripper spring of modified construction.

Fig. 10 is a fragmentary elevation of the punching apparatus shown in Fig. 9.

Figs. 11 and 12 are respectively a fragmentary sectional elevation and an elevation of a punching apparatus of modified construction.

Figs. 13 and 14 are respectively a fragmentary sectional elevation and an elevation of a punching apparatus of another modified form.

Figs. 15 and 16 are views similar to Figs. 11 and 12 but showing another modified form of holding the punches and dies in correct relation to the frame of the apparatus.

Figs. 17 and 18 are views similar to Figs. 11 and 12 but showing another modified construction for holding the punches and dies on the frame of the apparatus.

Fig. 19 is a fragmentary, top plan view of another form of punching apparatus embodying this invention.

Fig. 20 is a fragmentary elevation thereof.

Fig. 21 is a sectional elevation thereof, on an enlarged scale, on line 21—21, Fig. 19.

Fig. 22 is a fragmentary elevation of another modified form of punching apparatus.

Fig. 23 is a sectional elevation thereof, on line 23—23, Fig. 22.

Fig. 24 is a fragmentary, top plan view of a punching aparatus of another modified form.

Fig. 25 is a fragmentary elevation thereof.

Fig. 26 is a fragmentary, sectional view on an enlarged scale of the apparatus shown in Figs. 24 and 25, but having a strip template arranged thereon in place of the template shown in Figs. 24 and 25.

Fig. 27 is a sectional elevation, on line 27—27, Fig. 24, on the same scale as Fig. 26.

Fig. 28 is a fragmentary side elevation of a punching apparatus of slightly modified form.

Fig. 29 is a sectional elevation thereof, on line 29—29, Fig. 28.

Fig. 30 is a transverse sectional elevation of a punching apparatus of another modified form.

Fig. 31 is a fragmentary sectional elevation of a perforating apparatus having a frame of modified construction.

Fig. 32 is a fragmentary elevation of a perforating apparatus having a template of modified construction.

Fig. 33 is a transverse sectional elevation thereof, on line 33—33, Fig. 32.

Fig. 34 is an elevation of the template blank before the same is formed for accurate positioning of the perforating devices.

Fig. 35 is a similar view showing the template in finished form.

Figure 1:
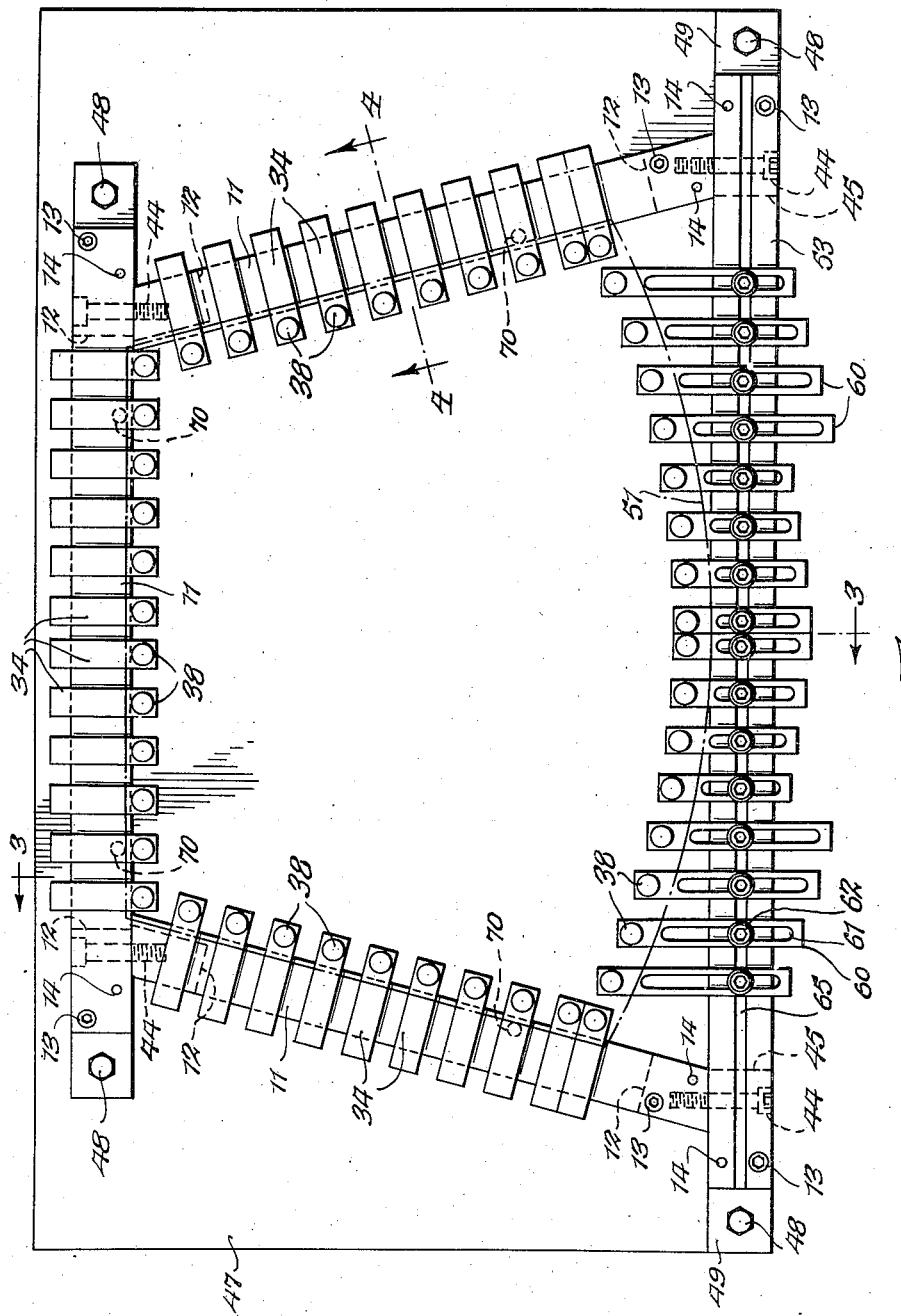
Fig. 1 is a top plan view of an apparatus embodying this invention for punching or perforating sheet material.

In accordance with this invention, one or more frames or supports are employed, each of which may, for example, include a pair of rigid frame members arranged in fixed parallel relation to each other and spaced apart by means of one or more spacing members, which may, for example, be in the form of blocks arranged between the adjacent ends of the frame members. Perforating members or devices, each comprising a punch unit and a die unit, are adjustably mounted on these frame members or supports and may be secured to the upper and lower portions thereof in such relation that the punch and die units will perforate the work so that the holes will be accurately spaced and located as desired. The correct location and securing of the perforating members on the frame or frames can best be done while the same are out of the press, so that the press can be used for other work while the adjusting and securing of the perforating members on their frame or frames is being done. When this is completed, the frame or frames may be positioned in a press so that one of the members of each frame, for example, the lower frame member, is secured to or rests on the bed of the press, and the parts of the perforating units which are secured to the other or upper member of each frame extend into position to be actuated by the ram of the press to perform the perforating operations.

It is an important feature of this invention that the movable punches or dies of the perforating devices which are mounted on the other or upper part of each frame are movably arranged on this member in such a manner that none of the pressure of the ram which affects the perforating of the work is transmitted to the upper frame member. Consequently, such other frame member is not caused to flex or move because of the perforating pressures exerted by the ram, and this is important, so that the punches and dies on each perforating unit will be maintained in accurate axial alinement under all working conditions, and so that they will not be moved out of alinement by such flexing. By means of this arrangement, it consequently, becomes possible to make the frames of such lengths that the wide sheets commonly employed in airplane construction may be inserted into the frames supporting the perforating units, between the ends thereof.

In Figs. 1 to 6, I have illustrated one embodiment of this invention in which four frames are employed which are connected to each other to form a perforating apparatus capable of forming perforations adjacent to the four edges of the work. The two sides and the rear frame are similar in that they are formed to produce perforations arranged in straight lines and the front frame is constructed for use in forming perforations not arranged in a straight line. The side and rear frames each include a lower rail or frame member 10 and an upper rail or frame member 11 preferably spaced from the lower rail, for example, by means of spacing blocks 12 arranged adjacent the ends of the two rails. The rails may be firmly secured to the spacing blocks in any suitable or desired manner, for example, by means of screws 13, and the rails may be held against movement by means of dowel pins 14 extending through the ends of the rails and the spacing blocks. Any other means for securing these rails to the blocks may be employed, if desired. After a frame is assembled, it is preferably subjected to a grinding operation so that the faces 15 and 16 (Figs. 4 and 5) lie in the same plane, which plane is also perpendicular to the base or lower face of the lower frame member 10 and to the upper faces of the two frame members. The faces 17 and 18 of the rails may, if desired, also be ground or otherwise accurately machined, so that they both lie in the same plane and parallel to the faces 15 and 16. The dowel pins 14 and screws 13 in the two ends of the frame insure that the rails remain fixed with the faces thereof in the proper planes and prevent any shifting of the parts of the frames. Frame members of any other suitable or desired construction may be provided, if desired.

The punching apparatus embodying this invention is herein described as used in connection with a press having a stationary bed 20 which is substantially horizontal and a ram 21 movable toward and from the bed 20. The frame member or rail which is to rest upon or be secured to the bed 20 is herein referred to as the "lower rail" and the other rail or frame member is herein referred to as the "upper rail," although it will be obvious that the punching apparatus embodying this invention may be equally well used in connection with a press in which the ram moves in a direction other than vertical, such for example as in a horizontal direction, so that the frames of the apparatus may be mounted in vertical or inclined positions.

The perforating devices employed in connection with the frame members described each comprises a die unit and a punch unit. In the constructions illustrated, the die units are mounted on the lower rail and the punches on the upper rail. It is obvious, however, that this arrangement may be reversed, as illustrated in my pending application for patent, Serial No. 441,594, so that the dies may be movably mounted on the upper rail while the punches and stripping mechanism may be mounted on the lower rail.

In the construction employed in connection with the side and rear frames in Fig. 1 and shown in Figs. 1 to 10, the die units, which are secured to the lower rail 10, each includes a die holder or clamp which may be rigidly secured to the lower rail 10 and on which the die is mounted. In the particular construction illustrated, the die holder includes a body portion 23 engaging the upper face of the rail 10, a flange or arm 24 which extends downwardly along the upright face 15 of the rail 10, and another downwardly extending arm or flange 25 which extends downwardly along the face 17 of the lower rail, so that the holder is substantially of inverted U shape. The die holder may, consequently, be moved lengthwise of the rail 10 for arranging it in correct relation to the work, and suitable means for securing each die holder in the desired position lengthwise of the rail 10 are provided. For this purpose, the downwardly extending arm 25 may be provided with a set screw 27 adapted to press against the face 17 of the rail. The arm 24 may be formed to engage the opposite face 15 of the rail, or if desired, the arm may be spaced from the face 15, as shown in the drawings, and may be provided with a projection or beveled flange portion 28 engaging an undercut or beveled edge or surface 29 of the rail 10, to hold the die holder in correct relation to the rail 10 when the set screw is tightened. By means of this construction, the set screw will draw the holder into a position in which the lower face of the body portion 23 thereof will be drawn into engagement with the upper face of the lower rail. The set screws 27 are preferably provided with lock nuts 27a as shown in Figs. 5 and 6, but short socket head set screws 27b, which when tightened have their outer ends arranged within the threaded holes in the holders, may be used, as shown in Fig. 4. The arm 25 of the holder is spaced from the face 17 of the frame member 10 sufficiently so that when the rail engaging end of the set screw 27 is withdrawn into the arm 25, the holder may be removed from the rail 10. Holders or clamping members of any other suitable form may be provided, if desired.

Each die holder is provided with a die 30 of any suitable or usual form, that shown being of cylindrical shape and having the lower portion thereof pressed into an accurately formed hole in the die holder so that the die 30 will extend parallel to the faces 15 and 16 of the rails 10 and 11. The die is provided in the upper end thereof with an aperture 31 of the desired size into which a punch may enter, and a portion of one side of the die may be milled out to intersect the aperture 31, as indicated at 32, so that the slugs or punchings removed from the work 33 may drop out of the die.

The punches may be mounted on punch holders 34 which may be substantially identical in construction with the die holders which have been described, and which are mounted on the upper rail or frame member 11. The punch holders 34 are each provided with a hole to receive a guide sleeve 35 for a punch 36. This hole is carefully formed in the punch holder 34 so as to be in axial alinement with a die 30 when a punch unit and a die unit are correctly mounted on a frame. The upper end of each punch guide sleeve 35 is preferably provided with a head or outwardly extending flange 37 and the punch 36 which extends to a considerable distance above the guide sleeve is also provided with an enlargement or head 38. A resilient stripping member, such as the stripper spring 39 shown in the drawings, is arranged between the heads 37 and 38 and preferably a weaker spring 40 is provided between the head 37 and the punch holder 34.

In setting up a frame for operation on the work, the required number of die holders are placed on the lower rails of the frame and are slid lengthwise of this rail into their correct positions and secured in such positions by means of the set screws 27. A punch unit is then placed on the upper rail 11 for each die unit on the lower rail and the punch units are so located on their rail that the punch of each punch unit will be in axial alinement with its die.

Any suitable means may be provided for positioning the punches of the punch units in axial alinement with their dies. This may conveniently be accomplished as shown in Fig. 5 by providing an alining member or dummy punch having a cylindrical portion 41 of such diameter as to fit slidably in the hole in the punch holder in which the guide sleeve 35 fits. This portion 41 consequently, is of the same diameter as the guide sleeve 35. The alining member also has an end portion 42 formed to enter the hole 31 of the die and to have a close fit therein, being of slightly greater diameter than the punch itself, since the punch must have a predetermined clearance with the hole in the die. This alining member preferably also has an upper handle portion 43, which may be knurled or roughened to facilitate handling of the same. When the punch 36 and the punch guide or stripper sleeve 35 are removed from the hole of a punch holder, the alining member or dummy punch is inserted into this hole and the holder 34 is moved lengthwise of its rail until the end portion 42 passes into the hole 31 of its die. The punch holder is then secured in this position and the alining member removed and replaced by a punch and punch guide sleeve, whereupon the punch will be in correct alinement with the die and will have the necessary clearance about its periphery with the die.

When all of these perforating units have been placed in their correct positions on the rails, the frame may be positioned in the press and is then ready for the perforating operations. Since the holders are removably mounted on the frames, each frame may be used for a number of different perforating operations on different work, and holders having dies of different sizes may be mounted on the frames. The same punch holders may be used for punches of different diameters, since the punches and their guide sleeve may be readily removed from their holders and replaced by other punches and guide sleeves. Also if it is desired to sharpen a punch, it is possible to withdraw a punch from its stripping sleeve 35 for sharpening or replacement by another punch of the same diameter.

In the operation of these perforating devices, it will be obvious that when the ram 21 engages the heads 38 of the punches, the punches and punch guide sleeves 35 will be moved from the position shown in Fig. 4 downwardly toward the dies 30 until the guide sleeve 35 engages the upper face of the work 33, as shown in Figs. 2, 3 and 6. Upon further downward movement of the ram 21, the guide sleeves 35 will remain stationary while the punches 36 penetrate the work and enter the holes 31 in the dies 30. The slugs or punchings removed from the work will pass from the holes 31 in the dies through the milled out openings 32. Upon the return or upward movement of the ram 21, the stripper spring 39 which has been compressed by the downward movement of the ram, will exert a downward pressure on the guide sleeves 35 and an upward pressure on the punch 36, thus withdrawing or stripping the punch from the work. As soon as the pressure on the spring 39, which is much stronger than the spring 40 is relieved, the guide sleeve 35 and punch 36 will be moved together away from the work back into the position shown in Fig. 4, by means of the lifting springs 40, whereupon the perforated work piece can readily be removed and replaced by another work piece.

It will be noted that during the perforating operation, none of the pressure exerted by the ram to compress the stripper springs 39 and to force the punches through the work is transmitted to the upper frame member. These upper frame members, consequently, serve only to support the upper parts of the perforating units, such as the punches and stripping means, in correct axial alinement with the dies, and to guide these punches in their movement relatively to the dies. Consequently, the upper frame members in my improved apparatus are not flexed or deflected during the punching operation and, consequently, maintain the punches in correct alinement with their dies at all times. The lifting springs 40 which are compressed during the punching operation are only of sufficient strength to support the weight of the punches and stripping means and to raise them to their upper positions as shown in Fig. 4, and consequently, the pressures exerted on the upper frame members by these lifting springs are insignificant and not sufficient to produce any appreciable deflection of these upper frame members. The lower frame members are supported throughout their lengths by the bed of the press and, consequently, are not deflected by the pressures exerted on the dies by the ram of the press.

When a plurality of frame members are to be used for perforating a single piece of work, such for example as shown in Fig. 1, the several frames of a perforating apparatus may be suitably secured together. For example, the side frame members may have their rear ends formed to fit against the front face of the rear frame member, and the spacing blocks at the rear ends of the side frame members may be secured to the spacing blocks of the rear frame members, and also the front ends of the side frame members may be correspondingly fitted to the rear edge of a front frame member. For example, screws 44 shown in broken lines in Fig. 1 and extending through spacing blocks of the front and rear frame members may be employed for securing the frames together. Any other suitable means for securing the various frame members together or in fixed relation to each other may be provided.

It may also be desirable in case a plurality of frame members are employed, to mount these frame members on a plate 47 as shown in Figs. 1 to 5, and this may be done by means of screws 48 which in the construction shown, extend through the ends of the lower rail or frame member 10 of the rear frame, which ends project beyond the spacing blocks 12, and by providing the front frame with lateral extending portions 49 secured to spacing blocks 45 thereof. When these frame members are mounted upon a plate 47, the various frame members and the parts mounted thereon are securely held in correct relation to each other, and when it is desired to perforate work by means of the apparatus shown in Fig. 1, it is merely necessary to slide the plate 47 and the parts mounted thereon on the bed of a press, whereupon perforating of the metal can be proceeded with.

The side and rear frames shown in Fig. 1, which have been described, are particularly adaptable for work in which the perforations are arranged in straight lines, although it is obvious that the frame members 10 and 11 could be curved or of any shape other than straight, if desired. Ordinarily, it is, however, much easier to construct the frame members with accuracy if the same are straight. In the construction shown in Fig. 1, the work piece 33 has an edge 51 which is curved, and consequently, different means are employed for mounting the perforating units on the front frame so that a series of holes may be stamped in the work equally spaced from the curved edge 51 thereof. For this purpose, the front frame member, as shown in Figs. 1 to 3, has an upper rail or frame member 53 mounted upon the spacing blocks 45, and the plate 47 itself serves as the lower frame member or rail, and means are provided for mounting the perforating units on the front frame member in such a manner that they may be adjusted not only lengthwise of the frame member as in the case of the side and rear frame members which have been described, but also transversely of the front frame member. Any suitable or desired means may be employed for this purpose, and in the construction shown, the die holders, which may be mounted directly upon the plate 47, have horizontal portions 54 which are provided with longitudinal slots 55 through which bolts or screws 56 extend, see particularly Figs. 2 and 3. The lower ends of these bolts or screws may engage in threaded holes in the plate 47, as clearly shown in the left side of Fig. 3. These horizontal portions are provided with upwardly extending arms or posts 57 which are suitably bored to receive the dies 30.

The punch holders may be similar in form to the die holders being provided with substantially horizontal portions 60 which are adapted to rest on the upper face of the upper rail or frame member 53 which is carefully machined to extend parallel to the plate 47, and these horizontal portions are also provided with slots 61 through which set screws 62 extend. The punch holders are provided with downwardly extending arms 63 which have holes bored therein extending accurately at right angles to the lower faces of the horizontal arms 60 of the holders, and guide or stripper sleeves 35 and punches 36 may be arranged in these holes in the same manner as illustrated in Figs. 4 and 6.

In order to permit the punches to be adjusted lengthwise of the upper rail or frame member 53 as well as crosswise thereof, this rail is preferably provided on its upper face with a dovetailed or undercut groove 65 and dovetailed or wedge-shaped nuts 66 formed to slide lengthwise in the groove 65 may be provided with which screws 62 engage. When the screws or bolts 62 are tightened, the punch holders will be securely held in place on the upper rail and the nuts 66 will be wedged in the undercut groove 65.

The use of the perforating devices employed on the front frame will be obvious from an inspection of Fig. 1, in which the various punch holders are shown adjusted in accordance with the particular holes required in the work 33. The slots 61 permit of adjustment of both the punch holders lengthwise as well as crosswise of the upper rail 53, and also these punch holders may be arranged at any desired angular relation to the rail. Similarly, the die holders may be adjusted relatively to their securing screws 56 within the limits provided by the slots 55 therein.

Gage means of any suitable type may be provided for engaging the work to facilitate the correct positioning of the same relatively to the perforating device. These gage means may be of any suitable desired type. In the construction shown in Fig. 1, I employ upright gage posts or pins 70 which may be secured in holes formed in the die holders, for example, in the horizontal or body portions 23 thereof. Two of these posts 70 are provided on holders mounted on the rear frame, and one such post 70 is shown on a holder on each side frame, but only one such gage post is necessary on the two side frames.

When the work to be perforated is inserted into the apparatus, it is moved into engagement with the gage posts or pins, thus ensuring the correct positioning of the work with reference to the perforating devices.

An alternative arrangement for locating the die holders in correct relation to each other and to the work is illustrated in Fig. 6, in which the die holder is provided in the lower face of the arm 24 with a hole for a pilot pin 72, this hole being carefully formed in the holder to be concentric with the axis of the die 30. The plate 47 may then be used as a template, and may be provided with a hole therein for the pilot pin 72 of each die holder. The pilot pins may be secured either in the holes in the die holders or in the holes in the template 47, and consequently, the die holders may be easily positioned correctly on the plate 47 by means of the pilot pins and may then be secured on their rails 10, and the punch units may then be mounted on their rails 11 with the punches 36 in axial alinement with the dies, as has already been described.

In Fig. 7, I have shown another arrangement of frame members mounted on a suitable plate 75 for providing the necessary perforations in a work piece 76 shown in broken lines. In this view, four frame members are arranged in spaced relation to each other and held in correct relation to each other by the plate 75, which may also serve as a template for correctly positioning the frame members relatively to each other. This may, for example, be accomplished by providing the plate 75 and extensions or end portions of the lower rails 10 with acurately positioned apertures in which pins 74 may enter to locate the frames on the plate. These pins 74 may either be secured to the template and fit into the holes of lower rail or they may be secured to the lower rail and fit into holes in the template, or the pins 74 may be dowels. After locating the frames in this manner, they may then be secured to the plate by means of screws 73.

The perforating units employed in connection with these frame members may in the main be identical with those heretofore described in connection with the side and rear frames shown in Fig. 1, for forming rows of perforations in the work parallel to the frame members. In cases, however, where additional perforations not located in such rows are required, one or more holders 77 may be made materially longer than the holders described in connection with Figs. 1 to 6, and a punch 78 may be located at one end of the elongated holder 77. It will be understood that the die holders arranged on the lower rail or frame member 10 (not shown) will also have extensions or elongated body portions corresponding to those of the punch holder 77 to support dies which may cooperate with the punch 78.

Another type of perforating unit also shown in Fig. 7 includes a punch holder 80 having an elongation or extension at one end of the body portion, and provided with a pair of punches 81 for cooperation with dies supoprted on a similarly shaped holder.

Fig. 7 also shows still another type of perforating unit in which the upper or punch holder is provided with an enlarged body portion 83 having an L-shaped extension at one or both ends thereof and provided with a plurality of punches 84 at the ends thereof; and this punch unit also cooperates with a corresponding die unit (not shown) on the lower frame member 10. It will be obvious that the perforating units mounted on the frame members may have many different shapes, depending upon the location of the holes to be provided in the work.

Stop gages of any suitable or desired type may be provided for cooperation with the work and in the upper portion of Fig. 7, there are shown in broken lines, two stop posts or gages 86, which are similar in construction to those shown in Fig. 1, except that these gage posts are mounted on holders or clamping members 87, which may be similar in construction to the clamping members or holders for the dies shown in Figs. 1 to 6, but which do not support a die. It will be obvious, however, that it is not necessary to secure the stop posts or gage members 86 to holders or clamping members 87 which may be secured to the lower rail, since obviously the stop posts 86 may be secured in holes formed in the lower rail 10, or they may be secured in any suitable or desired manner to any part of a frame or on the supporting plate 75 itself.

A side stop or gage member for engaging the side of the work is preferably also provided, and in the construction illustrated, this side gage member is secured to the lower rail of the second frame from the top in Fig. 7 and includes a clamping member or holder 89, which, as shown in Figs. 9 and 10, may be substantially identical with the holders for the punches and dies described in connection with Figs. 1 to 6, and which has an upwardly extending part 90 with which the side of the work 76 may engage. This side gage in conjunction with the two stops or gage members 86 will facilitate the accurate positioning of the work with reference to the punching apparatus. It will, of course, be obvious that the projection 90 must be of sufficient length to intercept the work and it will also be obvious that the stop projection 90 may equally well be formed to extend downwardly from a clamping member secured to the upper rail 11 of a frame.

In Fig. 8 is shown a gage which may be used either at the side or end of the work. This gage includes a holder or clamping member 91 which may be similar to the holders employed in connection with the punches or dies and which includes an upwardly extending arm 92 which may be substantially of the same width as the holder and which extends upwardly above the upper ends of the dies employed on the same rail. The holder may be positioned near an end of a frame, as is the gage 89 shown in Fig. 7, so that a side of the arm 92 is engaged by the side of the work. This holder may be moved lengthwise of the lower rail of a frame into the desired position for engagement with the side of the work, and then secured in such position.

The arm 92 may also be provided near the upper portion thereof on the same level as the work with a threaded hole in which an adjusting screw, such as a thumb screw 93, may engage. A lock nut 94 may be employed to secure the adjusting screw 93 in the desired position. When the gage device is positioned on the rear frame of a perforating apparatus, for example, in place of the gage devices 87 shown in Fig. 7, the adjusting screw 93 may be positioned so that the end thereof will engage the rear edge of the work as shown in Fig. 8.

It is also desirable to have the gage posts 70, Fig. 1, 86, Fig. 7, the gage arm 90, Figs. 9 and 10, and the gage arm 92, Fig. 8, terminate at their upper ends below the upper rail 11. Consequently, when the perforating operation has been completed and the punches and punch guide sleeves have been moved into their upper positions, the perforated work can be lifted above the gage devices and can, consequently, be removed from the press at the rear thereof, so that one person can feed the sheets to be perforated to the apparatus and actuate the press, and another person can remove the perforated sheets from the other end of the press.

In the frames heretofore described, the upper and lower rails were connected at their opposite ends to spacing members or blocks. Obviously any desired number of these spacing members may be employed, so long as they do not interfere with the insertion of the work between the rails. In Figs. 9 and 10, the rails 95 and 96 are connected and held in operative relation to each other at one end only thereof, for example, by means of a block 97. The lower rail 95 may be longer than the upper rail to provide means for securing the lower rail to the bed of a press or to a base plate. When the upper rail is not very long, the mounting of the same at one end only on the lower rail produces a desirable structure on which a number of perforating units may be adjustably mounted in the same manner as described in connection with Figs. 1 to 7 and the holders for the punches and dies used in connection with this frame may be identical with those heretofore described.

In Figs. 9 and 10, I have shown a modified form of stripper spring for withdrawing the punches from the work, which may be employed in place of the stripper spring 39 described in connection with Figs. 1 to 5. This stripper spring is formed of a plurality of dished washers or spring disks 95, which may be arranged in oppositely facing pairs, and which when not under compression by the ram 21, will hold the punch 36 in its elevated position in which the lower end of the punch is approximately flush with or slightly above the lower end of the guide sleeve 35. When pressure is applied to the disks, they are flattened to some extent to permit the punch to penetrate the work, and exert an upwardly directed force on the head 38 of the punch. The disks 95 are held in accurate spaced relation to each other due to the fact that each disk has a central aperture through which the upper portion of the punch 36 extends for holding the spring disks in correct relation to each other. Any other resilient means for stripping of the punch from the work may be used in place of those described.

In Figs. 11 to 18, I have shown various means for quickly attaching the punch and die holders on the rails or frame members. In Figs. 11 and 12, upper and lower frame members 100 and 101 are provided, the end blocks for connecting these frame members and holding them in spaced relation to each other not being shown. These rails or frame members are provided with beveled faces 102 at both of their lower longitudinal edges, and in addition, these frame members are also provided at opposite sides thereof with V-shaped grooves 103 extending substantially throughout the lengths of the upper and lower frame members.

The holders of the punch and die units are of angle-shape form, each having an upper or body portion 105 arranged to engage the upper face of a rail and terminating at one end thereof in a downwardly extending arm 106 extending in spaced relation to an upright face of the rail.

The lower end of the downwardly extending arm 106 may be provided with a beveled flange or spur 107 formed to cooperate with either beveled edge 102 of each of the rails 100 and 101. The lower holder of each perforating unit is bored to receive a die 30 and the upper holder is bored to receive a punch guide sleeve 35 within which the punch 36 may be arranged.

In order to secure a holder on either the rail 100 or 102, the other end of the body portion 105 of the holder is provided with a projecting portion or arm 108 extending beyond the side of the rail opposite to the side at which the arm 106 is arranged, and this extending portion 108 is preferably of materially less thickness than the main body portion 105 of the holder. A bifurcated lever 109 is mounted by means of a pivot 110 on the arm 108 and this lever has a spur or projection 111, which is formed to extend into a V-shaped recess 103 of a rail 100 or 101. The other arm of the lever 109 is provided with a threaded hole through which a thumb screw 112 may extend, and the top member 105 of the holder is preferably provided with an upwardly extending abutment 114 with which the end of the thumb screw 112 may engage. It will be obvious from an inspection of Figs. 11 and 12 that when the thumb screw 112 is tightened, the lever 109 will be swung to cause the spur 111 thereof to engage in the groove 103 of a rail, and thus secure the holder firmly and securely on the rail. It will also be obvious that when the thumb screw is released, the lever may be swung into a position to disengage the rail on which it is mounted so that the holder may be readily removed from the rail. A lock nut 116 may be employed to secure the thumb screw 112 in its clamping position.

In Figs. 13 and 14, the frame members 100 and 101 may be of the same form as those shown in Figs. 11 and 12, and the holders for the punch and die units differ from those shown in Figs. 11 and 12 only in the means for clamping the holders on the upper and lower rails of the frames. In Figs. 13 and 14, the holders 120 have bifurcated end portions 121 provided with pivot pins 122 on which curved levers 123 are pivotally mounted. Each lever has a short arm terminating in a spur or projection 124 which may enter a groove 103 of a rail or frame member and the longer arm of the lever extends above the horizontal body portion of the holder 120 and has a threaded aperture to receive a thumb screw 125 for swinging the lever 123 into position to lock the holder on its rail. 126 represents a lock nut for the thumb screw 125.

In the construction shown in Figs. 15 and 16, holders 130 are provided which are adapted to cooperate with rails or frame members 100 and 101 similar to those described in connection with Figs. 11 and 12. In this case, each holder may be secured in its operative position on a rail by means of a lever 131, one end of which bears against the body portion of the holder 130, and the other end of which has a spur or V-shaped part 132 which enters the groove 103 of the rail. A screw 133 extends through a hole of the lever 131 and enters into a threaded hole in the body portion of the holder 130, so that by tightening the screw 133, the holder will be securely clamped in correct operative position on its rail.

In Figs. 15 and 16, I have also shown by way of example another form of template for securing the holders on the lower rail in correct relation to each other. For this purpose, a template 134 in the form of a strip of metal having accurately spaced holes therein is provided in a groove or recess formed in the upper face of one of the frame members or rails, preferably the lower rail 100. The groove is preferably somewhat wider than the strip template 134 and the template may be secured in the groove against movement lengthwise thereof and is accurately located lengthwise of the groove.

Each holder 130 which is intended to cooperate with the strip template 134, is provided with an accurately formed hole in the body portion thereof into which a slip pin 135 may pass, the slip pin having a reduced end portion formed to extend into one of the holes in the template 134. The upper end of the slip pin may have a knurled handle portion to facilitate the use of the same. When a slip pin is positioned on a holder and in the template as shown in the lower portion of Fig. 15, it will be obvious that the holder is in correct position lengthwise of its rail and may then be secured in place by means of the clamping means, such as the screw 133. On tightening the screw 133, a slight movement of the holder to the right in Fig. 15, may result, and this movement is transmitted by the slip pin to the template. Since the slot for the slip pin is slightly wider than the template, the template can move sidewise in this slot to the extent necessary to permit tightening of the screw 133. Preferably after securing the first holder in place, its slip or locating pin is left in place to avoid shifting of the template relatively to the rail and the holders. Each holder on the lower rail may be secured in place in this manner, but any other means for locating the holders in correct relation to each other may be employed. While I have shown this strip template only on Fig. 15, it is obvious that it may be employed on other constructions herein described. Locating devices on the holders other than the slip pins for cooperation with the strip template 134 may be employed, if desired.

In the construction shown in Figs. 17 and 18, the rails 136 and 137 are employed, which differ from the rails 100 and 101, in that the grooves 103 are omitted from the rails 136 and 137. The holders 138 for the punches and dies are each provided with an extension or pivot part 139, to which a bifurcated lever 140 may be pivoted by means of a pin 141. The lower arm of this lever is provided with a beveled part 142 adapted to engage one of the beveled or inclined faces 102 of the rail, and the other end of the lever extends over the top of the body portion of the holder 138 somewhat in the manner of the levers 123 shown in Figs. 13 and 14. A screw 143 has a threaded engagement with the upper lever arm 140 and bears against the upper face of the holder 138, so that by tightening this screw, the part 142 of the lever engages the beveled face 102 opposite to that engaged by the spur or projection 107 of the holder, so that the holder will be securely locked in place on its rail.

The constructions thus far described are usable in connection with work of very substantial width, for the reason that none of the strains of punching the work and compressing the stripping springs of the punches are transmitted to the upper frame member or rail of any frame. It may, however, be desirable to use these frames in connection with work of such width that the upper frame members heretofore described would have a tendency to sag or become deflected, due to their own weight, and thus interfere with the accurate axial alinement of the punches relatively to the dies.

The construction shown in Figs. 19 to 21 may be used when frame members or rails of exceptional length are required to permit work to be inserted into the frames. In the construction shown by way of example in Figs. 19 to 21, each frame has a lower rail or frame member 165, which may be of substantially the same shape as the rails 10 heretofore described in connection with Figs. 1 to 10, since the lower rail is supported throughout its length by the bed 20 of the press. The upper rail 166, however, is of a shape which will resist flexing of the same to a greater extent than the frame members heretofore described, for example, by making the upper rail 166 of materially greater height than width. When rails of this type are employed, I arrange them so that the lower surfaces thereof are arranged at a somewhat higher elevation than the lower faces of the rails 11, and I then secure the punch holders to the lower face of the upper rail. This may be accomplished in any suitable or desired manner. For example, punch holders 167 may be provided which are substantially of U or channel-shape so as to engage the bottom face and the lower portions of the two upright side faces of the upper rail 166, and one or both upright legs of the U-shaped holders 167 may be bored to receive the movable member of a perforating unit. Any suitable or desired means may be provided for securing these holders 167 to the rails 166, and in the construction shown, the lower face of the rail 166 is provided with a dove-tailed groove 168 which may receive nuts 169 with which screws or bolts 170 extending through the holders, engage, as clearly shown in Figs. 21. By placing the dove-tailed slot 168 in the middle of the lower face of a frame member 166, it will be obvious that the holders 167 may be turned so that the punch carried by any holder may be arranged at either side of the frame.

In Figs. 19 and 20, three frame members are shown which may be bolted or otherwise secured to a plate 173 which may then in turn be secured to the bed 20 of a press. The lower rail 165 of each frame may be longer than the upper rail 166 and extend beyond the spacing blocks 174 and for accurately positioning each frame on the base plate 173, dowel pins 175 may be employed which extend through holes in the base plate and the lower frame member 165 and screws 176 may be employed for rigidly holding the frames in their correct positions on the base plate.

Any suitable means may be provided for facilitating the correct positioning of the work in the frames. For example, gage members 178 may be clamped to the lower rail and may be provided with upwardly extending arms or parts to engage a side of the work 179, and end stop members or gage posts 180 may be provided which may, for example, be mounted on clamping members 181 having enlarged downwardly extending arms 182 and mounted on the lower rail 165 as shown. These gage posts 180 together with one or more side gage members 178 make it possible to position the work easily and accurately into correct positions with reference to the various perforating devices on the several frames.

When long frame members are provided to support wide sheets of material, the proper feeding of the sheets into the apparatus may be facilitated by providing one or more feed rails 184 which may be mounted in any suitable or desired manner on the lower rails 165, and which preferably extend slightly beyond the work receiving end of the first frame member, as clearly shown in Figs. 19 to 21 so that an edge of the work may first be placed on the projecting ends of these feed rails and may then be slid into the apparatus into engagement with the stops or gage members 178 and 180. These feed rails are fitted between the perforating sets wherever desired, and as many of these feed rails may be provided as may be necessary to facilitate the feeding of the work into the apparatus and to prevent sagging of the work.

In Figs. 22 and 23, I have shown a frame of a construction similar to that shown in Figs. 1 to 10, but in which holders of modified construction are shown, which are adapted to cooperate with stripping members having a plurality of springs for each punch, which may be desirable in making perforations in heavier work. In these figures, the holders 190 for the punches may be in general similar to the holders 34 shown in Figs. 1 to 5, except that I have shown thumb screws 191 in place of the screws 27 shown in Figs. 1 to 10, and the holders are provided with downwardly extending legs or parts 192 of materially larger size. The punch guide and stripping sleeves 193 are provided with enlarged heads 194, and the head 195 of the punch bears against a yoke or plate 196 of substantially the same size as the head 194 of the guide sleeve 193. In addition to the stripper spring 197, which extends around the punch 198, I provide additional stripper springs 200, two such springs being shown by way of example in Figs. 22 and 23, and these springs extend about guide posts or bolts 201, the lower ends of which may be secured by screw threads or other suitable means to the head 194 of the punch guide sleeve 193 and these bolts may extend freely through holes in the plate 196. The bolts have heads 202 which engage the upper face of the yoke plate 196, and thus limit the extent to which the springs 197 and 200 may move the punch relatively to the guide and stripper sleeve 193 and these bolts may also be adjusted to vary the initial compression of the springs 197 and 200, so that these springs may be under considerable compression before they are further compressed by the ram when driving the punch through the work.

The springs may be arranged in rows lengthwise of the holders 190 and when so arranged, the punches provided with a plurality of springs occupy no more room lengthwise of a frame than do the punches with single springs. Means may also be provided for holding these springs and the head 194 and the yoke or plate 196 in alinement with the holder 190, and by way of example, I have shown the head 194 provided with a pin 204 which is slidable in a hole 205 in the extension 192 of the holder. The pin 204 may, as in the construction, be a part of one of the bolts 201. A relatively light lifting spring 205a, corresponding to the spring 40 shown in Figs. 1 to 10, may be arranged about the pin 204 between the head 194 and the upper face of the holder 190, or if desired, this spring may be arranged about the punch guide and stripper sleeve 193 as in the single spring constructions already described.

In the operation of the apparatus described, when parts are normally in a position in which the lower end of the punch sleeve 193 is substantially flush with the lower face of the rail or frame member 11, the punch and guide sleeve being held in this upper position (not shown) by means of a spring 205a, the work is inserted into the perforating apparatus. Upon the descent of the ram 21 into engagement with the heads 195 of the punches, the punches together with the springs and stripper sleeves will move bodily relatively to the upper holders 190 without subjecting these holders or the upper rails or frame members to any pressure other than that resulting from the compression of the light lifting springs 205a. When the parts have moved into the positions shown in Figs. 22 and 23, farther downward movement of the ram results in downward movement of the punches only, farther movement of the guide sleeves 193 being prevented by contact with the work above the dies. This farther movement results in the passing of the lower ends of the punches through the work and into the holes in the dies and in further compression of the springs 197 and 200, and this punching movement also exerts no force upon the upper frame member or rail 11 other than the compression of the lifting springs 205a. Upon the upward movement of the ram 21, the stripper springs withdraw the punches from the work and into the ends of the stripper sleeves, and thereupon the guide sleeves 193 and the stripper springs are moved upwardly by the lifting springs 205a until the lower ends of the punches and guide sleeves 193 are approximately in the plane of the lower face of the upper rail 11, to allow ample clearance between the punches and dies for easy feeding of the work to the apparatus.

In Figs. 24 to 27, is shown another modified form of this invention which is desirable for some specific uses and which includes a frame having a lower rail or frame member 210 of materially greater width than the rails of construction heretofore described, and an upper rail 211 which is also wider than those heretofore described, but preferably of less width than the lower frame member 210. The two frame members are spaced apart at one or both of their ends by means of blocks 212.

The lower frame member 210 may be provided with holders for the dies 30 which may be so formed that the holders may be clamped or secured to the upper face of the lower plate 210 and preferably so that the clamping means are beyond the edges of the upper plate 211 so that these holders may be readily accessible. In the construction illustrated by way of example, the holders 214 may be in the form of substantially rectangular bars having the dies 30 secured thereto near one end of each holder. The holders may be secured in place by means of clamping screws 215 engaging nuts 216 which may, for example, be arranged in dove-tailed grooves 217 formed in the lower frame member 210 and extending longitudinally thereof. The holders may have slots 218 therein to permit adjustment thereof relatively to the rail 210.

The die holders 214 may be adjusted for correctly positioning the dies relatively to each other and to the work in any suitable or desired manner. In some instances, a correctly perforated sample specimen of the work or a template thereof 220 may be provided as shown in Figs. 24, 25 and 27, such work piece or template being placed on the top surface of the lower frame member or rail 210, so that the die holders 214 may be placed on top of the work piece or template 220. In order to facilitate the positioning of the die holders in correct relation to the work piece or template, each die holder is preferably provided with a pilot pin 221 which extends downwardly from the lower face of the die holder, and which is arranged on the die holder in axial alinement with the die 30. The lower frame member or rail 210 is provided with grooves 222 in the upper face thereof which may receive the lower ends of the pilot pins 221 which project through the apertures in the work piece or template. The work piece or template is also provided with holes therein through which the bolts 215 may pass in order to engage the nuts 216 in the dove-tailed grooves of the lower rail. The holes for the bolts 215 need not be accurately formed in the work piece or template, since the die holder 214 will be positioned accurately by the pilot pins extending through accurately formed holes in the template or sample piece 220.

The punch holders may be of any suitable or desired construction, and as illustrated by way of example, these punch holders have rectangular bar-like body portions 224 adapted to fit on the top surface of the upper frame member or rail 211 and may be secured thereto in any suitable or desired manner, for example, by means of bolts 225 engaging nuts 226 arranged in dove-tailed slots 227 formed in the upper face of the upper rail 211. The holes in the body portion 224 through which the bolts 225 pass are preferably in the form of slots, as shown in Fig. 27, so that ample adjustment of the punch holders relatively to the bolts and to the upper rail is provided for.

The body portions 224 of the punch holders are provided with downwardly extending portions or arms 229 and accurately formed holes are provided which extend through the body portions and the projections or arms 229 to guide the punch sleeves 230 in which the punches 231 move toward and from the die. The stripper springs illustrated in Figs. 24 to 27 may be similar to those described in connection with Figs. 22 and 23, or may be of any other suitable or desired form.

In the use of this mechanism, the die holders are first accurately positioned on the lower frame member, for example, by means of an accurately made sample work piece or template 220. The punch units are then mounted on the upper frame member 211 so that the punches are in correct accurate alinement with the dies with which they cooperate. This may, for example, be conveniently done by using a dummy punch or alining member, as shown in Fig. 5. Suitable gage members or stops for the work may be provided as heretofore described in connection with other perforating apparatus or in any other suitable or desired manner, and the apparatus is then ready to operate on the work.

It is possible also to use the apparatus shown in Figs. 24 to 27 by means of one or more templates 234 in the form of strips of metal of such size as to fit into the grooves or slots 222 and which have holes accurately positioned therein to receive the pilot pins 221, as shown in Fig. 26. These pilot pins may, for example, be secured to the template and extend into holes in the holders 124 concentric with the die 30. The pilot pins may, however, be secured to the holders and extend into the holes in the template. In most of the work for which punching apparatus embodying this invention is employed, such for example as for the punching of rivet holes in airplane wings or fuselage parts, the rivets are all arranged with their axes in straight lines, and consequently, these strip templates 224 extending lengthwise of the lower frame member or rail 210 may be advantageously employed for locating the dies in correct relation to each other, and the punching units are then mounted on the upper rail 211 as described in connection with the template or sample work piece 220.

In this construction, as well as in all of those heretofore described, none of the perforating pressure exerted by the ram on the punches nor the pressure for compressing the stripper springs is transmitted to the upper rails, so that the upper rails have no tendency to flex or bend during the perforating operations, and this is essential in order that the punches and dies may remain in accurate axial alinement at all times. The very slight pressure resulting from the compression of the lifting springs is not sufficient to cause any bending or deflection of the upper frame members. However, at times the frames required for certain operations may be so long that the weight of the metal of the upper frame members may cause sufficient deflection or bending of the upper frame members to render correct axial alining of the punches with the dies impossible. In the event that long frames are required to perforate the work, for example, frames of approximately eight feet or more in length, the construction shown in Figs. 28 and 29 may be employed, in which the upper frame member or rail 240 may be provided at one side thereof with an upwardly extending flange 241 which greatly stiffens this upper frame member. The opposite ends of this frame member may rest upon and be secured to spacing blocks 242, the lower faces of which are secured to the lower frame member or rail 243. Each die 30 may be mounted on its die holder 244 in the usual manner, and this die holder may in turn be secured to the lower rail 243 in any suitable or desired manner, and as shown in these figures, the die holders are similar in form to those described in connection with Figs. 24 to 27, being secured by bolts engaging nuts in dove-tailed grooves 245 formed lengthwise of the lower rail. Strip templates 246 may also be provided for correctly positioning the dies on the lower frame member.

The punch holders 248 may also be similar to those shown in Figs. 24 to 27 and are clamped to a flat upwardly facing surface of the upper rail 240 at a side of the flange 241. This upper rail may also have a dove-tailed groove 249 formed therein which cooperates with the bolts for securing the punch holders in place. In Figs. 28 and 29, stops or gage members are shown for engaging a side of the work as it is fed into the punching apparatus, and these gage members may be provided with holders 250 similar to the die holders 244, but which have upwardly extending stop arms or projections 251 formed thereon. These gage or stop members may, consequently, be adjusted lengthwise of the dove-tailed groove of the lower rail of the apparatus, so that when a side of the work engages the gage member, this side will be accurately spaced with reference to the perforations to be performed in the work. Stop gages for cooperating with the ends of the work may be constructed as hereinbefore described.

When it becomes necessary to provide frame members of such length that the structure shown in Figs. 28 and 29 will not be free from such slight deflections or bending as might prevent the punches from being in axial alinement with the dies, as might, for example, be the case when an extremely long frame is to be mounted on a press brake, a construction such as illustrated by way of example in Fig. 30 may be provided in which 255 represents a lower rail secured to the bed of the press brake and 256 represents the ram. In this case, a beam or stiffening member 257 is suitably mounted at its ends in fixed relation to the frame or housing of the press. The beam may be of any suitable or desired form, a beam of H-shaped cross section being provided in the construction illustrated. A frame such as shown in Figs. 28 and 29 may be mounted on the press brake in such a manner that the upwardly extending flange 241 extends parallel to and in contact with a part of the beam 257. While the rail 240 and the beam 257 of such length may bend or deflect because of their own weight, the rail may, nevertheless, be secured to the beam 257 in such a manner so that it is free from any deflection and extends parallel to the lower rail 255. This may be done by temporarily employing one or more spacer gages or blocks 355 identical in height with the spacing blocks 242 at the ends of the frame, and employing these spacer gages to space the upper rail at intervals along its length correctly from the lower rail 255. While the upper rail is so spaced, screws 259 extending through holes in the flanges 241 and into the beam 257 are being tightened, whereupon the spacer gages may be removed. Any desired or necessary number of these screws may be employed and in this manner, an absolutely parallel relationship between the upper and lower rails of the frame may be obtained throughout the length of the rails, regardless of any deflections in the beam 257.

In Fig. 31, I have shown a modified form of frame 263, in which the upper and lower rails 264 and 265 of the frame are formed integrally with the frame. This frame 263, shown by way of example in Fig. 31, is formed of a bar of substantially rectangular cross section and the upper portion thereof is machined to constitute the upper rail of the frame and the lower portion thereof is formed to constitute the lower rail of the frame. The upper and lower surfaces of the frame are accurately machined to lie in parallel planes and the sides of the frame member are preferably provided with beveled or V-shaped grooves 266 in which the beveled projections or flanges of the holders of the perforating devices may engage. The upper holder 267 may be identical with the holders hereinbefore described and the lower holder 268 is employed on the frame in inverted position, with the legs thereof extending upwardly. A die 30 is secured to an upwardly extending leg of the holder 268, and a socket-headed clamping screw 270 secures this holder on the lower rail 265 of the frame. In this construction, the lower face of the holder 268 may rest upon the bed of the press, or on a template or supporting plate 271, which may be supported on the bed of a press. The holder 268 and the template 271 may be provided with accurately located holes with which a pilot pin 272 may cooperate for positioning the lower holders in correct relation to each other. The upper holders 267 support the punches and stripping sleeves in the same manner as heretofore described, and may be secured to the frame as heretofore described, so that the punches are in axial alinement with the dies. This frame 263 may be used when the work 274 is to be perforated near an edge thereof and in cases where it is unnecessary to pass the work between the upper and lower rails of the frame.

In Figs. 32 to 35, I have shown a perforating apparatus somewhat similar to that shown in Figs. 9 and 10, but provided with a template of modified construction. In these figures, the lower rail 277 is provided with a groove or rabbet 278 into which a part of a template 280 may fit. This template is in the form of a metal strip and the upper edge thereof extends above the upper surface of the rail 277 and is provided with notches or recesses in the upper portion thereof into which the holders 281 may fit. The rabbetted portion 278 of the lower rail may extend throughout the length of this rail, or may be only of sufficient length to receive the template 280.

The notched template may be formed in any suitable or desired manner. Preferably, the template is first provided with a series of dove-tailed or undercut recesses 282, as shown in Fig. 34, the upper edges of the recesses being preferably of less width than the width of the holders 281. The edges or corners 283 of the template may then be bent upwardly in any suitable manner and may be filed or ground so as to accurately fit against the opposite sides of the holders 281, so that the finished template is provided with projections 284 at opposite sides of the notches or recesses. The advantage of this construction is that these templates can be made with a high degree of accuracy and the holders can also be located relatively to each other with a high degree of accuracy by varying the spacing of the projections 284 at opposite sides of the recess. For example, if it should be necessary to move a recess in Fig. 35 slightly to the left, the projection 284 on the right side of such recess may be struck with a hammer so that the same is bent inwardly and moved to the left. The opposite projection 284 of the same recess may then be moved to the left by either striking it on its inner face so as to bend it farther to the left, or by filing or grinding the inner face of this recess. In this manner, slight errors in the template can be easily corrected.

The upper rail 286 of the frame and the holders mounted thereon may be of the same construction as those heretofore described and by making these holders of uniform width, they can be easily fitted into any of the recesses in the template, as shown in Fig. 32.

By means of the perforating apparatus and process herein described, a very large number of holes may be simultaneously punched in large sheets of material such, for example, as sections of the surface sheets of airplane wings, fuselages, and the like. The apparatus can easily be adjusted so that these holes will be punched in accurate relation to each other and to the edges of the work. Since the holders for the punches and dies are readily removable from their frames, and since they can be easily adjusted lengthwise of their frames to produce any desired spacing of holes, the apparatus can be readily set up to operate on a large number of different jobs. The apparatus is also so constructed that the work can be easily and quickly positioned in the apparatus in accurate relation to the perforating devices, and consequently, the apparatus is capable of producing large quantities of work in a relatively short time. Since all pieces of work of any job will be exactly identical and will have the holes located therein with a high degree of accuracy, the subsequent time required for riveting the sheets is correspondingly reduced.

The apparatus described has the further advantage that all of the setting up of the frames relatively to each other and of the perforating devices and stop gages on the frames can be effected while the same are out of the press. Consequently, very little time is required to place the apparatus on the bed of a press and to remove the apparatus therefrom and replace it by another apparatus set up for another job. Consequently, the idle time of the press is greatly reduced.

The perforating devices can be easily removed from the frame or frames of one punching apparatus, and then employed on another apparatus. This can also be done with the frames, which can be removed from one base plate or template to another. Consequently, for each job it is only necessary to provide one template or set of templates and the frames and perforating devices may be used repeatedly with different templates on different jobs. If more work pieces of the same job might be required at a later time, it is necessary only to store the templates for any job, and not the complete punching apparatus. Once the templates are provided for mounting the frames in correct relation to each other, and/or the templates for mounting the perforating devices on the frames, no skilled labor is required to assemble a perforating apparatus.

I claim as my invention:

1. Perforating apparatus for use in a press having a bed and a ram, including a frame having rigid rails spaced apart to receive the work between them, one rail being supported by the bed of the press and the other rail being rigidly spaced therefrom, holders secured to said rails, cooperating punch members and die members on said holders, said punch members each including punch guide sleeves relatively to which a punch is slidable, and a stripper spring acting on said punch and sleeve to draw the punch into said sleeve, the members on the holders secured to said spaced rail being slidable on their holders toward and from the work and being positioned to be actuated by said ram for effecting perforation of the work, whereby pressure required for perforating the work and stripping the same from the punches is transmitted by the slidable members to the work without passing to said spaced rail.

2. Perforating apparatus for use in a press having a bed and a ram, including a frame having rigid rails spaced apart to receive the work between them, one rail being supported by the bed of the press and the other rail being rigidly spaced therefrom, dies mounted on said rail supported by said bed, guide sleeves slidably mounted on said spaced rail for movement toward and from said dies, punches slidably mounted in said sleeves and having parts extending into position to be engaged by said ram, stripping springs interposed between said sleeves and said punch and which are compressed when the punch penetrates the work, whereby pressure exerted by the ram on the punches to perforate the work and for stripping the punches from the work are transmitted to the work and to the dies without passing to said spaced rail.

3. A perforating apparatus including a pair of parallel rails arranged in fixed relation to each other, holders for punches and stripping members and holders for dies mounted on said rails for adjustment independently of each other and relatively to said rails and adapted to be arranged in pairs with a punch on one rail in axial alinement with a die on the other rail, said stripping members being freely slidable relatively to said apparatus lengthwise of said punches to relieve said rails of strains required for stripping the punches from the work.

4. A perforating apparatus including a pair of parallel rails arranged in fixed relation to each other, holders for punches and holders for dies mounted on said rails for adjustment independently of each other and relatively to said rails and adapted to be arranged in pairs with a punch on one rail in axial alinement with a die on the other rail, guide sleeves in which said punches are slidable and which are slidable on the holders for the punches toward and from the dies, and stripper springs acting on said sleeves and said punches to draw said punches into said sleeves.

5. An apparatus for perforating sheets of material, which includes upper and lower rails extending parallel to each other, and perforating devices adjustably mounted on said rails, each perforating device including a pair of holders, one having a punch member and the other having a die member mounted thereon, one of said members supported on the upper rail being slidably mounted on its holder for operative movement toward and from the other member, said holders supporting said members at a side of said rails, said holders being adjustable lengthwise of said rails, and means for securing said holders in adjusted positions on said rails.

6. An apparatus for perforating sheets of material, which includes upper and lower rails extending parallel to each other, and perforating devices adjustably mounted on said rails, each perforating device including a pair of holders, one having a punch member and the other having a die member mounted thereon, one of said members being slidably mounted on its holder for operative movement toward and from the other member, said holders supporting said members at a side of said rails, and means for normally holding said members in spaced relation to each other to permit the insertion of work between said members.

7. Punching apparatus including a rigid frame, a plurality of pairs of holders adjustable lengthwise of said frame and arranged with one holder of a pair located above the other holder of the pair, punch and die members mounted on said holders at a side of said frame and arranged for axial alinement with each other, one of said members being movable axially relatively to the other member to perforate work placed between said members.

8. Punching apparatus including holders for punch members and other holders for die members, and a rigid support to which a plurality of said holders may be secured in pairs with the die of one holder in axial alinement with the punch of another holder, said punches and dies being arranged at a side of said rigid support in position to permit work to be perforated to be inserted between said punches and dies, one of said members of a pair being movable on its holder to cause perforation of the work.

9. Punching apparatus according to claim 8, characterized in that the holders and the rigid support are formed to permit adjustment of the holders on the support to position the punch and die members in the desired relation to the work and in axial alinement with each other.

10. Punching apparatus including a rigid support adapted to be mounted in a press between the bed and ram thereof, a plurality of pairs of holders, each of said holders being formed for mounting and adjustment on said support and having means for securing said holders in adjusted position on said support, means on one holder of each pair for supporting a punch member including a punch guide sleeve and a stripper spring thereon, means on the other holder of each pair for supporting a die member thereon, one of said members being slidably mounted on its holder to move axially toward and from the member on the other holder of a pair, said holders when mounted on said support being positioned so that the ram moves the slidably mounted member in a direction to perforate the work.

11. A method of punching a plurality of rows of holes in sheet material, which includes the steps of mounting cooperating punch and die units in correct spaced relation to each other on supporting frames, then mounting the frames on a template in correct spaced relation to each other, and then actuating said units to perforate the work.

12. A method of punching a plurality of rows of holes in sheet material, which includes the steps of mounting cooperating punch and die units in correct spaced relation to each other on supporting frames, placing locating devices on a template for accurately positioning said frames in correct relation to each other on said template, securing the frames on said template while positioned by locating devices, and actuating said units to perforate the work.

13. A method of punching a plurality of holes in sheet material, which includes positioning a plurality of supporting frames in correct relation to each other, mounting templates on said frames in correct positions relatively to said frames, mounting perforating devices on said frames while correctly positioned thereon by means of said templates, and placing said apparatus in a press for actuation of said perforating devices by the movable ram of the press.

14. A method of punching a plurality of holes in sheet material, which includes positioning a plurality of supporting frames in correct relation to each other by means of a template having locating devices thereon for positioning said frames, mounting templates on said frames in correct positions relatively to said frames, mounting perforating devices on said frames while correctly positioned thereon by means of said templates, and placing said apparatus in a press for actuation of said perforating devices by the movable ram of the press.

15. An apparatus for punching a plurality of rows of holes in sheet material, which includes a plurality of frames having upper and lower rails, perforating units each including two separate parts, one having a punch and the other having a die, one of said parts being mounted on one rail and the other part on the other rail, and a template for said frames, locating devices on said template for accurately positioning said frames in correct relation to each other on said template, and means for securing said frames on said template while located by said locating devices.

16. An apparatus for punching a plurality of rows of holes in sheet material, which includes a plurality of frames having upper and lower rails, perforating units each including two separate parts, one having a punch and the other having a die, one of said parts being mounted on one rail and the other part on the other rail, and a template for said frames, locating devices on said template for accurately positioning said frames in correct relation to each other on said template, means for securing said frames on said template while located by said locating devices, and gage members arranged in fixed relation to said frames and against which the work is placed for correctly locating the same with relation to said perforating units.

17. An apparatus for punching a plurality of rows of holes in sheet material, which includes a plurality of frames, perforating members each including a pair of holders carrying a punch unit and a die unit spaced from each other on said frames, and means on said frames for locating one of said units of each perforating member in correct relation to said frame and to corresponding units of other perforating members.

18. A method of punching a large number of accurately located holes in sheet material, which includes mounting a supporting frame on a template, providing said template with locating means arranged coaxial with the holes desired in the work, mounting holders for dies on said template in accordance with said locating devices, securing said holders on said frame, and securing other holders on an upper portion of said frame with punches slidably arranged thereon in axial alinement with the dies of said first mentioned holders, inserting the work between said punches and dies, and actuating said punches to perforate the work.

19. An apparatus for punching a large number of accurately located holes in sheet material, which includes a plurality of frames having upper and lower rails, a template on which said frames are mounted in correct relation to each other, a plurality of perforating units, each including a holder having a punch member mounted thereon and another holder having a die member mounted thereon, one of said members being movable in the direction of its axis relatively to its holder, means for securing said holders in cooperating pairs on said frames, and locating devices on said template for cooperation with one holder of each pair for locating the same in correct relation to the work and to the holders of other pairs.

20. An apparatus for punching a large number of holes in sheet material in accurate relation to each other, including a substantially flat template, a plurality of rigid frame members mounted on said template in correct relation to to each other and having upper and lower rails, holders for dies on said lower rail and adjustable lengthwise thereof, said holders and said template having cooperating locating devices for positioning said die holders in correct operative relation to each other, means for securing said die holders to said frame members, and holders for punches mounted on the upper rails of said frame members and adjustable lengthwise thereof into axial alinement with the dies of the other holders, said punches being slidable on their holders toward and from said dies to perforate the work, and means for normally holding said punches in spaced relation to said dies to permit insertion of the work between said punches and said dies.

21. In a perforating apparatus, the combination of a frame adapted to be positioned between the bed and ram of a press and including upper and lower rails having horizontal and upright faces, a plurality of pairs of holders adapted to be secured to said frame and each having a body portion arranged to engage a horizontal face of a rail and having legs straddling said rail, means on one leg of each holder securing said holder on its rail, said holders being arranged in pairs, one holder of a pair being secured to the upper rail and the other holder of the pair being secured to the lower rail, cooperating punch and die units mounted on the other legs of said holders of each pair, the unit on the upper holder being slidable thereon toward and from the unit on the lower holder, for perforating the work.

22. In a perforating apparatus, the combination of a frame adapted to be positioned between the bed and ram of a press and including upper and lower rails having horizontal and upright faces, a plurality of pairs of holders adapted to be secured to said frame and each having a body portion arranged to engage a horizontal face of a rail and having legs straddling said rail and provided with means for gripping said rail to secure the holders in place thereon, said holders being arranged in pairs, one holder of a pair having a die unit and the other holder of a pair having a punch unit arranged thereon, said holders being adjustable on said rails to position said punch and die units in the desired relation to said rail and in axial alinement with each other, one of said units of each pair being slidable on its holder toward and from the other unit to perforate the work.

23. In a perforating apparatus, the combination of a frame adapted to be positioned between the bed and ram of a press and including upper and lower rails having horizontal and upright faces, a plurality of pairs of holders adapted to be secured to said frame and each having a body portion arranged to engage a horizontal face of a rail and having legs straddling said rail, cooperating wedge means on one of said legs of each holder and on each rail for drawing said holder into engagement with the horizontal face of its rail, clamping means on the other leg of said holder for engaging the rail to secure said holder in place thereon, and a perforating unit mounted on a leg of each holder.

24. In a perforating apparatus, the combination of a frame adapted to be positioned between the bed and ram of a press and including upper and lower rails, a plurality of perforating devices mounted on said frame and each including a pair of holders, one holder of each pair being mounted on the upper rail, and the other holder of the pair being mounted on the lower rail, a punch member on one of said holders and a die on the other holder, one of said members being movable toward and from the other member relatively to its holder, means for adjusting each holder lengthwise of its rail, and means for permitting adjustment of each holder of a pair in a direction transversely of its rail.

25. In a perforating apparatus, the combination of a frame adapted to be positioned between the bed and ram of a press and including upper and lower rails, perforating devices adapted to be secured to said frame and each including a pair of holders, one holder being secured to the upper rail and the other holder to the lower rail, means for adjustably securing said holders to said rails, a plurality of dies mounted on one of said holders, and a plurality of punches mounted on the other of said holders for cooperation with said dies.

26. A sheet metal perforating apparatus including a frame for supporting a plurality of perforating devices and including upper and lower rails, each perforating device including a pair of holders adjustably mounted on said rails, one holder being constructed to be secured to the upper rail and the other holder being constructed to be secured to the lower rail, a die secured to one of said holders the other holder being bored to receive a punch formed to cooperate with said die, and a positioning member adapted to be placed in the bore of said last mentioned holder for locating said holder in correct axial alinement with said die to enable the punch and die of a pair of holders to be arranged in correct operative relation to each other.

27. An apparatus for punching a plurality of accurately spaced holes in sheet material, including a frame having upper and lower rails, perforating devices mounted on said frame and each comprising a pair of holders, one holder being mounted on the upper rail of said frame, and the other holder being mounted on the lower rail, a die on one of said holders and a stripper sleeve mounted on the other holder, a punch arranged within said stripper sleeve and adapted to extend beyond said stripper sleeve, a spring connecting the punch and stripper sleeve for normally holding the punch within the stripper sleeve, said spring being compressed during the perforating operation, said holders being adjustable on said frame to arrange said punch in axial alinement with said die, and means for normally holding said punch and stripper sleeve separated from said die to permit insertion of work between the punch and die.

28. A perforating apparatus including a frame having upper and lower rails, a plurality of perforating devices for mounting on said frame and each including a pair of holders carrying a punch and a die and adapted to be mounted on said frame with said punch and die in axial alinement, each holder and said frame having cooperating inclined faces for urging said holder into wedging relation to a rail of said frame, a lever pivotally mounted on said holder in position to engage said frame, and means for urging said lever in a direction to cause its holder to be clamped to a rail of said frame.

29. A perforating apparatus including a frame having upper and lower rails, perforating devices each including a pair of holders, one holder having a die mounted thereon and the other holder having a punch mounted thereon, said holders being formed for adjustment lengthwise of said frame on said rails, a template mounted on said frame member and having a locating device adapted to cooperate with a holder of each perforating device for locating said holder in the desired relation lengthwise of the frame.

30. A perforating apparatus in accordance with claim 29, and in which the frame is provided with a depression therein in which said template may be located.

31. A perforating apparatus in accordance with claim 29, in which the template is provided with accurately positioned holes, and means on a holder of each pair formed to cooperate with a hole of the template for locating the holders relatively to each other lengthwise of said frame.

32. A perforating apparatus in accordance with claim 29, and in which the template is provided with accurately located holes, and in which the holders are provided with holes, and pins formed to enter holes in the template and the holder for locating such holder in correct relation to the template.

33. A perforating apparatus including a frame having upper and lower rails, a plurality of perforating devices mounted on said frame, each of said devices including a pair of holders, one holder of the pair being provided with a die member, and the other holder of the pair being provided with a punch member, said holders being adjustable lengthwise of said frame, means for securing said holders in fixed relation to said frame with the punch member of one holder in axial alinement with the die member of the other holder, a template formed for accurately positioning relatively to said frame and having holes therein accurately formed therein in accordance with the location of the holes in the work, one of the holders of each pair being provided with a hole therein coaxial with the member mounted thereon, and a locating pin extending into a hole of the template and said hole in said holder for accurately locating the holder with relation to the template.

34. A perforating apparatus including a frame, perforating devices arranged to be mounted on said frame and each including a pair of holders, one holder having a die mounted thereon, and the other holder having a punch mounted thereon, and a strip template mounted on said frame in correct relation lengthwise thereof, and having notches in an edge thereof, each notch being formed to receive a portion of a holder for locating one holder of each perforating device in correct relation to said frame.

35. A perforating apparatus including a frame, perforating devices arranged to be mounted on said frame and each including a pair of holders, one holder having a die mounted thereon, and the other holder having a punch mounted thereon, and a strip template mounted on said frame in correct relation lengthwise thereof, and having notches in an edge thereof, each notch being formed to receive a portion of a holder for locating one holder of each perforating device in correct relation to said frame, said frame having a recess adapted to receive said template with said edge of said template extending out of said recess to permit said holders to enter into the notches thereof.

36. A template for use in connection with perforating apparatus having a frame and a plurality of holders for perforating devices adjustably mounted on said frame, said template including a strip of metal having undercut notches arranged in an edge portion thereof, the portions of the material at the ends of said notches being formed to engage portions of said holders for accurately positioning the same on said frame.

37. A perforating apparatus including a frame, a plurality of perforating devices adjustably mounted on said frame, each of said devices including a pair of holders, one of said holders having a die mounted thereon, and the other holder having a punch mounted thereon, means for clamping said holders to said frame with the punch and die of each pair in axial alinement, and a stop gage member on one of said holders and extending into a position to engage an edge of the work when the same is fed to the apparatus.

38. A perforating apparatus including a frame having upper and lower rails spaced apart to permit work to be passed between said rails, a plurality of perforating devices each including a pair of holders, one holder of a pair being secured to the lower rail and the other holder of the pair being secured to the upper rail, one of said holders supporting a die and the other holder supporting a punch, a stop gage on said frame and including a part adapted to be engaged by the work when the same is in correct relation to the apparatus and between said punches and dies, said stop gage terminating above the normal position of the work when fed to said punches and dies and below the upper frame member, so that the work when perforated may be removed from the apparatus by passing the same over said stop gage.

39. A perforating apparatus including a frame having upper and lower rails, perforating devices each including a die supporting holder and a punch supporting holder, the holders of a pair being secured to said rails with the punch and die thereof in axial alinement, another holder secured to one of said rails and having a stop gage extending into position to be engaged by an edge of the work when the work is in operative position to said punches and dies.

40. A perforating apparatus including a frame having upper and lower rails, perforating devices each including a die supporting holder and a punch supporting holder, the holders of a pair being secured to said rails with the punch and die thereof in axial alinement, and another holder adapted to be secured to said frame, and means on said last mentioned holder adjustable relatively thereto and extending in position to engage an edge of the work when the same is in correct relation to said punches and dies.

41. A perforating apparatus including a frame having upper and lower rails, perforating devices each including a die supporting holder and a punch supporting holder, the holders of a pair being secured to said rails with the punch and die thereof in axial alinement, and another holder adapted to be secured to said frame, and having a rigid part extending into the plane of the work when in the apparatus, and a set screw mounted on said part to engage the work and adjustable to vary the location of the work relatively to the punches and dies.

42. Apparatus for simultaneously forming a large number of perforations arranged in a long row, said apparatus including a frame having a lower rail adapted to be supported by the bed of a press and an upper rail arranged in spaced relation to said lower rail, said upper rail having a cross sectional shape for resisting bending of the same due to its own weight, a plurality of perforating devices, each including a pair of holders, one adapted to be secured to the lower rail, and the other adapted to be secured to the upper rail, one of said holders supporting a die at a side of said frame and the other holder supporting a punch at the same side of said frame, and means for securing said holders to said rails in position with the die and punch of each pair in axial alinement with each other.

43. Apparatus for simultaneously forming a large number of perforations arranged in a long row, said apparatus including a frame having a lower rail adapted to be supported by the bed of a press and an upper rail arranged in spaced relation to said lower rail, said upper rail being of a cross section having a greater height than width to resist bending of the upper rail due to its weight, a plurality of perforating devices, each including a pair of holders, one adapted to be secured to the lower rail, and the other adapted to be secured to the upper rail, one of said holders supporting a die at a side of said frame and the other holder supporting a punch at the same side of said frame, said lower holder including a part extending across and bearing against the upper face of said lower rail and said upper rail having a part extending across and bearing against the lower face of the upper rail and securing means for holding said holders to their rails with the punch and die of a pair of holders in axial alinement.

44. Apparatus for simultaneously forming a large number of perforations arranged in a long row, said apparatus including a frame having a lower rail adapted to be supported by the bed of a press and an upper rail arranged in spaced relation to said lower rail and having an upwardly extending flange to resist deflection of said upper rail due to its weight, and a plurality of perforating devices mounted on said rails, each perforating device including a pair of holders, one secured to the upper rail and the other secured to the lower rail, one of said holders supporting a die at a side of said frame, and the other holder supporting a punch at the same side of said frame and adapted to be positioned with said punch in operative relation to said die.

45. Apparatus for simultaneously forming a large number of perforations arranged in a long row, said apparatus including a frame having a lower rail adapted to be supported by the bed of a press, and an upper rail arranged in spaced relation to said lower rail, a beam extending parallel to said upper rail and in close proximity thereto, means for supporting the upper rail at intervals on said beam to maintain said upper rail in uniformly spaced relation to said lower rail, a plurality of perforating devices mounted on said frame and each including a pair of holders, one holder supporting a die unit, and the other holder supporting a punch unit in substantially axial alinement with said die unit, said punch and die units being arranged at a side of said frame, the unit of each pair which is supported on the upper frame member extending into position to be actuated by the ram of the press and having a slidable connection with its holder, whereby perforating pressure exerted by the ram is not transmitted to said upper frame member.

46. A perforating apparatus including a frame having upper and lower rails, a plurality of perforating devices mounted on said frame and each including a pair of holders, one holder of each perforating device supporting a die at a side of said frame, and the other holder of the pair supporting a punch at the same side of said frame in operative relation to said die, a guide sleeve for said punch slidably mounted in said last mentioned holder and within which said punch is slidable, a plurality of springs interposed between said sleeve and said punch, said springs being compressed when said punch is forced through the work, and means for normally spacing said sleeve and punch from said die to permit insertion and withdrawal of the work between said punch and die.

47. A perforating apparatus including a frame having upper and lower rails, a plurality of perforating devices mounted on said frame and each including a pair of holders, one holder of each perforating device supporting a die at a side of said frame, and the other holder of the pair supporting a punch at the same side of said frame in operative relation to said die, a guide sleeve for said punch slidably mounted in said last mentioned holder and within which said punch is slidable, a plurality of springs interposed between said sleeve and said punch, said springs being compressed when said punch is forced through the work, means for normally spacing said sleeve and punch from said die to permit insertion and withdrawal of the work between said punch and die, said springs being arranged in a row, and means for holding said springs substantially in alinement with said holder.

48. An apparatus for punching accurately positioned holes in sheet material, including a frame having a lower rail and an upper rail spaced from said lower rail, a plurality of perforating devices, each including a die mounted in fixed relation to said lower rail and a punch mounted on said upper rail and movable relatively to said upper rail into operative relation to said die, and a work supporting member secured to said lower rail and having the upper edge thereof arranged at substantially the same level as the upper ends of said dies and along which the work may be slid between said rails into operative relation to said punches and dies.

49. Punching apparatus including a rigid unitary frame having upper and lower rails each having a horizontal face and a face extending at an angle to the horizontal face accurately machined, holders adjustable lengthwise of said rails and formed to be drawn against said accurately machined faces, cooperating punch units and die units mounted on said holders, the units mounted on the holders of the upper rail being movable relatively to their holders towards and from the units on the holders of the lower rail, to perforate the work.

50. A method of arranging punch and die holders adjustably mounted on parallel rails arranged one above the other, in positions in which the punch and die will be in correct axial alinement, one of said holders having a die secured therein and the other holder being bored to receive a punch for cooperation with the die, which includes mounting one of the holders in correct position on its rail in accordance with the location of the hole required in the work, inserting into said bore a positioning member having one end thereof formed to fit snugly in said die, and shifting that holder which is not secured to its rail into a position in which said positioning member fits into said die, and then removing said positioning member from said bore and placing said punch in said bore.

51. Punching apparatus including a rigid unitary frame provided with upper and lower rails having their upper faces machined accurately to produce horizontal surfaces and having their lower faces terminating in an upwardly and outwardly inclined beveled surface, holders of substantially C-shape having their intermediate portions formed to rest on the upper faces of said rails and each having one end engaging said beveled surface, the other end of each holder having clamping means for urging said holders into engagement with a machined horizontal surface and with a beveled surface, and punches and dies mounted on said holders for cooperation with each other.

52. Perforating apparatus for use in a press having a bed and a ram, including a frame having rigid rails spaced apart to receive the work between them, one rail being supported by the bed of the press and the other rail being rigidly spaced therefrom, said rails having substantially upright and horizontal faces, a longitudinally extending V-shaped groove in an upright face of each rail, the lower edge of the opposite upright face being beveled, pairs of holders adjustable lengthwise of said rails, one holder of each pair being mounted on the lower rail and the other holder being mounted on the other rail, said holders having body portions resting on the upper faces of said rails and having arms extending downwardly along the opposite upright faces of said rails, one of said arms having a toe portion with an inclined face formed to engage the beveled edge of its rail, and clamping means on the other arm adapted to enter said V-shaped groove and draw said body portions of said holders into engagement with the upper horizontal face of its rail, a punch on one holder of each pair and a die on the other holder, for cooperation with said punch.

53. Apparatus for use in connection with a press having a bed and a ram movable toward and from the bed, said apparatus including a frame having a lower rail adapted to be supported by the bed of a press and an upper rail arranged in spaced relation to the lower rail, said rails being of sufficient length so that the upper rail will normally be deflected intermediate of its ends because of its weight and length, holders for punches and dies arranged in pairs, one holder of each pair being secured to the upper rail and the other holder being secured to the lower rail with the punch of one holder in axial alinement with the die of the other holder, a beam mounted on the press and spaced from the path of movement of said ram, and means for securing said upper rail at intervals to said beam for supporting all portions of the upper rail in uniform spaced relation to the lower rail.

54. An apparatus according to claim 53 and including a spacing block of a height equal to the desired distance between rails, said spacing block being positioned between said rails at the portions thereof which are being secured to said beam.

55. A method of securing the upper of two long rails of a perforating apapratus in uniformly spaced relation to the lower rail by means of a beam positioned adjacent to the upper rail, which includes positioning a spacing block of a height equal to the desired distance between said rails, securing the upper rail to said beam immediately adjacent to the spacing block, moving the spacing block to different positions lengthwise of said rails, and securing other portions of said upper rail to said beam in immediate vicinity to said spacing block, so that said upper rail will be truly parallel to said lower rail regardless of the deflection or said beam.

GEORGE F. WALES.